(12) United States Patent
Saitoh et al.

(10) Patent No.: US 8,972,644 B2
(45) Date of Patent: *Mar. 3, 2015

(54) DATA FORWARDING CIRCUIT, DATA FORWARDING METHOD, DISPLAY DEVICE, HOST-SIDE DEVICE, AND ELECTRONIC APPARATUS

(71) Applicant: Sharp Kabushiki Kaisha, Osaka-shi, Osaka (JP)

(72) Inventors: Kohji Saitoh, Osaka (JP); Masaki Uehata, Osaka (JP); Asahi Yamato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,222

(22) Filed: Apr. 22, 2014

(65) Prior Publication Data

US 2014/0225851 A1    Aug. 14, 2014

Related U.S. Application Data

(63) Continuation of application No. 13/885,806, filed as application No. PCT/JP2011/076199 on Nov. 14, 2011, now Pat. No. 8,732,376.

(30) Foreign Application Priority Data

Nov. 19, 2010    (JP) ................................. 2010-259140

(51) Int. Cl.
*G06F 13/40*    (2006.01)
*G06F 3/041*    (2006.01)
(Continued)

(52) U.S. Cl.
CPC ................ *G09G 5/001* (2013.01); *G06F 3/041* (2013.01); *G09G 5/04* (2013.01); *G06F 1/3253* (2013.01); *G06F 1/3262* (2013.01); *G09G 3/20* (2013.01); *G09G 5/006* (2013.01); *Y02B 60/1235* (2013.01); *G09G 3/003* (2013.01); *G09G 2310/08* (2013.01); *G09G 2330/021* (2013.01); *G09G 2340/0428* (2013.01); *G09G 2340/0435* (2013.01); *G09G 2350/00* (2013.01);
(Continued)

(58) Field of Classification Search
None
See application file for complete search history.

(56) References Cited

U.S. PATENT DOCUMENTS

2003/0128198 A1    7/2003    Mizuyabu et al.
2004/0036669 A1    2/2004    Yanagi et al.
(Continued)

FOREIGN PATENT DOCUMENTS

KR    10-0623501 B1    9/2006

OTHER PUBLICATIONS

Saitoh et al., "Data Forwarding Circuit, Data Forwarding Method, Display Device, Host-side Device, and Electronic Apparatus", U.S. Appl. No. 13/855,806, filed May 16, 2013.
(Continued)

*Primary Examiner* — Hyun Nam
(74) *Attorney, Agent, or Firm* — Keating & Bennett, LLP

(57) ABSTRACT

The timing controller determines the number of data lanes (11, 12, 13), which are used to transfer data, based on information in relation to an amount of data to be transferred during a predetermined time period. Out of the plurality of data lanes (11, 12, 13), the determined number of data lane(s) (11, 12, 13) are used to transfer data. Further, a data lane(s) (11, 12, 13) which is not used in the data transfer is deactivated.

16 Claims, 16 Drawing Sheets

(51) Int. Cl.
*G09G 5/00* (2006.01)
*G09G 5/04* (2006.01)
*G06F 1/32* (2006.01)
*G09G 3/20* (2006.01)
*G09G 3/00* (2006.01)

(52) U.S. Cl.
CPC ........ *G09G2352/00* (2013.01); *G09G 2360/18* (2013.01); *G09G 2370/08* (2013.01); *G09G 2370/14* (2013.01)
USPC .......................................... 710/307; 345/173

(56) References Cited

U.S. PATENT DOCUMENTS

2009/0231485 A1    9/2009  Steinke
2011/0249684 A1*  10/2011  Nagai et al. ................... 370/419

OTHER PUBLICATIONS

Official Communication issued in corresponding European Patent Application No. 11842223.7, mailed on Nov. 26, 2014.

* cited by examiner

F I G. 2 3
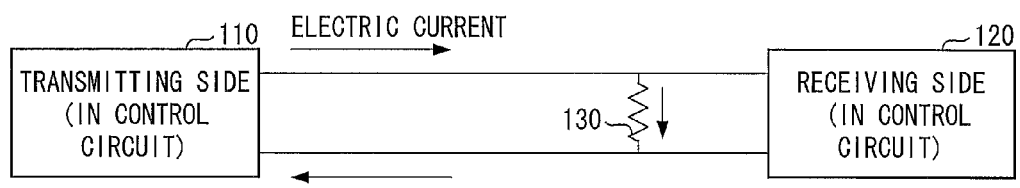

DATA FORWARDING CIRCUIT, DATA FORWARDING METHOD, DISPLAY DEVICE, HOST-SIDE DEVICE, AND ELECTRONIC APPARATUS

TECHNICAL FIELD

The present invention relates to a data transfer circuit for transferring data with the use of a data lane, a data transfer method, a display device, a host-side device, and an electronic apparatus.

BACKGROUND ART

In recent years, flat panel displays such as a liquid crystal display device have employed a high-speed serial interface such as LVDS (Low Voltage Differential Signaling) so as to carry out data transfer. In accordance with such a high-speed serial interface, the data transfer is carried out by (i) a transmitter circuit section for transmitting serialized data as a differential signal and (ii) a receiver circuit for differentially amplifying the differential signal.

Patent Literature 1 discloses a technique to carry out the data transfer with reduced power consumption. Specifically, according to Patent Literature 1, a transmitter circuit section includes a plurality of transmitter sections, and data is gathered in a blank bit of data, which is to be transmitted by a certain transmitter section, so that data to be transmitted by another transmitter section is reduced or is reduced to zero. Here, a transmitter section that transfers a small amount of data is set to a low transfer mode, and a transmitter section that does not transfer data (i.e., transfer data amount is 0) is set to a sleep mode. With the configuration, power consumption is suppressed.

CITATION LIST

Patent Literature

Patent Literature 1: Japanese Patent Application Publication, Tokukai, No. 2007-206232 A (Publication Date: Aug. 16, 2007)

SUMMARY OF INVENTION

Technical Problem

The inventors of the present invention focused attention on the fact that it is important, for reducing power consumption in the data transfer, to suppress a continuous electric current that flows across the transmitter circuit section and the receiver circuit, rather than to suppress an electric current consumed by the transmitter circuit section and the receiver circuit. The following description will explain reasons for this with reference to FIG. 23.

FIG. 23 is a schematic view for explaining a configuration for carrying out the data transfer. In FIG. 23, a transmitting side 110 is a device including a transmitter circuit section, and a receiving side 120 is a device including a receiver circuit. A plural pairs of differential signal lines are provided between the transmitter circuit section and the receiver circuit, and a termination resistor 130 is provided in each pair of differential signal lines (in FIG. 23, one pair of differential signal lines is illustrated on behalf of the plural pairs of differential signal lines). During the data transfer, a continuous electric current flows in each of the pairs of differential signals, and a large amount of power is therefore consumed by the termination resistor 130. Here, the termination resistor can be included in the receiver circuit.

Under the circumstances, in order to reduce power consumption in the data transfer, it is more effective to decrease the number of pairs of differential signals (i) in which a steady-state electric current flows and (ii) which are transferred at a high transfer rate, rather than to suppress a consumed electric current by setting the transmitter circuit section to transfer signals at a low transfer rate.

According to Patent Literature 1, the number of pairs of differential signals in which a steady-state electric current flows can be decreased by setting the transmitter section to the sleep mode. However, in Patent Literature 1, the plurality of transmitter sections are individually determined to or not to be in the sleep mode depending on respective amounts of data to be transferred by the plurality of transmitter sections. This method is not sufficient for actively and flexibly increasing or decreasing the number of pairs of differential signals in which a steady-state electric current flows.

Moreover, according to Patent Literature 1, in a case where a certain transmitter section is set to the low transfer mode, the other transmitter sections remain a normal transfer mode. This causes the transmitter sections to have different transfer speeds. However, in order to set different transfer speeds, clocks having frequencies corresponding to the respective different transfer speeds are required, and therefore it is necessary to provide clock lanes corresponding to the respective transmitter sections. As a result, a circuit scale is enlarged, and accordingly power consumption will be increased.

The present invention is accomplished in view of the problem, and its object is to provide a data transfer device, a data transfer method, a display device, a host-side device, and an electronic apparatus, which can reduce power consumption with a simple configuration.

Solution to Problem

In order to attain the object, a data transfer circuit of the present invention is a data transfer circuit for transferring data with use of at least one of a plurality of data lanes, the data transfer circuit including: determining means for determining, based on information in relation to an amount of data to be transferred during a predetermined time period, the number of data lanes via which the data is transferred; transferring means for transferring the data with use of a determined number of data lane(s), which number has been determined by the determining means, out of the plurality of data lanes; and data lane deactivating means for deactivating a data lane(s), which is not used to transfer the data, out of the plurality of data lanes.

According to the configuration, the data transfer circuit determines, based on an amount of data to be transferred during the predetermined time period, the number of data lanes which are to be used in data transfer. Then, the data transfer circuit transmits the data with the use of the determined number of the data lane(s). Further, the data transfer circuit deactivates a data lane(s) which is not used in the data transfer. That is, only the data lane(s) which is necessary to transfer data is used, and the rest of data lane(s) is not used. Further, the data lane(s) which is not used is deactivated so as to save electric power that is to be consumed when the data lane(s) is activated.

According to the data transfer circuit of the present invention, each of the data lanes is controlled to be used or not to be used in data transfer. That is, a transfer rate is not changed for each data lane. In a case where a data lane is used in data transfer, the data is transferred at a normal transfer rate, whereas, in a case where a data lane is not used in data transfer, the transfer rate is set to zero. According to the configuration, it is unnecessary to provide a clock for adjusting a transfer rate for each data lane. In other words, the circuit configuration will not become complicated, as compared with a conventional technique.

As above described, the data transfer circuit brings about an effect of reducing power consumption with a simple configuration.

In order to attain the object, a data transfer method of the present invention is a method for transferring data with use of at least one of a plurality of data lanes, the method including the steps of: determining, based on information in relation to an amount of data to be transferred during a predetermined time period, the number of data lanes via which the data is transferred; transferring the data with use of a determined number of data lane(s), which number has been determined in the determining step, out of the plurality of data lanes; and deactivating a data lane(s), which is not used to transfer the data, out of the plurality of data lanes.

According to the configuration, it is possible to bring about an effect similar to that brought about by the data transfer circuit of the present invention.

In order to attain the object, a display device of the present invention includes: the data transfer circuit above described, the data transfer circuit serving as a timing controller for transferring data, which is indicative of the image, to a source driver; and performance lowering means for lowering a performance of an output circuit that is provided in the source driver and supplies an analog voltage to the display panel during the halt period.

According to the configuration, the data transfer circuit (i) deactivates all the data lanes and (ii) lowers the performance of the output circuit during the halt period in which the data indicative of the image is not transferred. This allows reduction in power consumed by the output circuit, and accordingly it is possible to further reduce power consumption of the entire display device.

In order to attain the object, a host-side device of the present invention includes the data transfer circuit above described.

According to the configuration, it is possible to provide the host-side device that can reduce power consumption by changing the number of used data lanes in accordance with a transfer rate of image data.

In order to attain the object, another electronic apparatus of the present invention is an electronic apparatus including: a display device; and a host-side device, the display device including the data transfer circuit above described, the data transfer circuit serving as a timing controller for transferring data, which is indicative of the image, to a source driver, and the host-side device including the data transfer circuit above described, the data transfer circuit serving as a graphic controller for transferring data, which is indicative of the image, to the timing controller.

According to the configuration, during a halt period in which data indicative of an image is not transferred, (i) all data lines for transferring data to the source driver and (ii) all data lines for transferring data to the timing controller are deactivated. On the other hand, during a transfer period, the data lines for transferring data to the source driver and the data lines for transferring data to the timing controller are activated so that data is transferred. This allows a frequency, at which data supplied from the host-side device is written into a frame memory, to be equal to a frequency at which image data is read out from the frame memory. As a result, a clock signal, which is used to transfer data from the host-side device to the display device, can be used as a clock signal that is used to read out data from the frame memory in the display device. Therefore, it is not necessary to additionally provide a clock generation circuit for generating a new clock signal.

In order to attain the object, another electronic apparatus of the present invention is an electronic apparatus including: a display device; and an input device, the display device including the data transfer circuit above described, the data transfer circuit serving as a timing controller for transferring data, which is indicative of the image, to a source driver, and the input device including a touch panel and sensing means which (i) refrains from carrying out sensing of the touch panel during the transfer period and (ii) carries out sensing of the touch panel during the halt period.

According to the configuration, the electronic apparatus carries out sensing of the touch panel during the transfer period, whereas does not carry out sensing of the touch panel during the halt period. That is, the sensing of the touch panel is carried out while avoiding a time period during which data indicative of an image is transferred. With the configuration, it is possible to prevent a noise, which is caused by data transfer, from being mixed to the sensing of the touch panel. This allows an improvement in sensing accuracy.

In order to attain the object, a display device of the present invention includes the data transfer circuit.

According to the configuration, it is possible to provide the display device that can reduce power consumption by changing the number of used data lanes in accordance with a transfer rate of image data.

Advantageous Effects of Invention

The data transfer circuit of the present invention brings about an effect of reducing power consumption with a simple configuration.

BRIEF DESCRIPTION OF DRAWINGS

FIG. 1 is a circuit diagram illustrating a configuration for transferring data in a display device in accordance with Embodiment 1 of the present invention.

FIG. 2 is a view schematically illustrating a configuration of the display device in accordance with Embodiment 1 of the present invention.

FIG. 3 is a view for explaining activation/deactivation of serial signal transmission lines in the display device illustrated in FIG. 2.

FIG. 4 is a view for explaining activation/deactivation of serial signal transmission lines in the display device illustrated in FIG. 2.

FIG. 5 is a view for explaining activation/deactivation of serial signal transmission lines in the display device illustrated in FIG. 2.

FIG. 6 is a view for explaining activation/deactivation of serial signal transmission lines in the display device illustrated in FIG. 2.

FIG. 7 is a view illustrating a timing chart for data transfer carried out in the display device illustrated in FIG. 2.

FIG. 8 is a view for explaining how pieces of data to be transferred are sorted in the display device illustrated in FIG. 2.

FIG. 9 is a view for explaining how pieces of data to be transferred are sorted in the display device illustrated in FIG. 2.

FIG. 10 is a view illustrating data to be transferred, which data has not been sorted yet in the display device illustrated in FIG. 2.

FIG. 11 is a view illustrating an example of data to be transferred, which data has been sorted in the display device illustrated in FIG. 2.

FIG. 12 is a view illustrating a timing chart in a case where the display device is in a normal driving mode, in accordance with Embodiment 2 of the present invention.

FIG. 13 is a view illustrating a timing chart in a case where the display device is in a low power mode, in accordance with Embodiment 2 of the present invention.

FIG. 14 is a view for explaining activation/deactivation of serial signal transmission lines during a high-speed transfer period in the display device, in accordance with Embodiment 2 of the present invention.

FIG. 15 is a view for explaining activation/deactivation of serial signal transmission lines during a low-speed period in the display device, in accordance with Embodiment 2 of the present invention.

FIG. 16 is a view illustrating another timing chart in a case where the display device is in a low power mode, in accordance with Embodiment 2 of the present invention.

FIG. 17 is a view for explaining activation/deactivation of serial signal transmission lines in a display system in accordance with Embodiment 3 of the present invention.

FIG. 18 is a view for explaining activation/deactivation of serial signal transmission lines in the display system in accordance with Embodiment 3 of the present invention.

FIG. 19 is a view for explaining activation/deactivation of serial signal transmission lines in a display system in accordance with Embodiment 4 of the present invention.

FIG. 20 is a block diagram illustrating a configuration of an electronic apparatus in accordance with Embodiment 5 of the present invention.

FIG. 21 is a view illustrating a timing chart in a case where the electronic apparatus is in a normal driving mode, in accordance with Embodiment 5 of the present invention.

FIG. 22 is a view illustrating a timing chart in a case where the electronic apparatus is in a low power mode, in accordance with Embodiment 5 of the present invention.

FIG. 23

FIG. 23 is a schematic view for explaining a configuration for carrying out data transfer.

DESCRIPTION OF EMBODIMENTS

[Embodiment 1]

The following description will discuss Embodiment 1 of the present invention, with reference to FIGS. 1 through 11.

Figure 2:
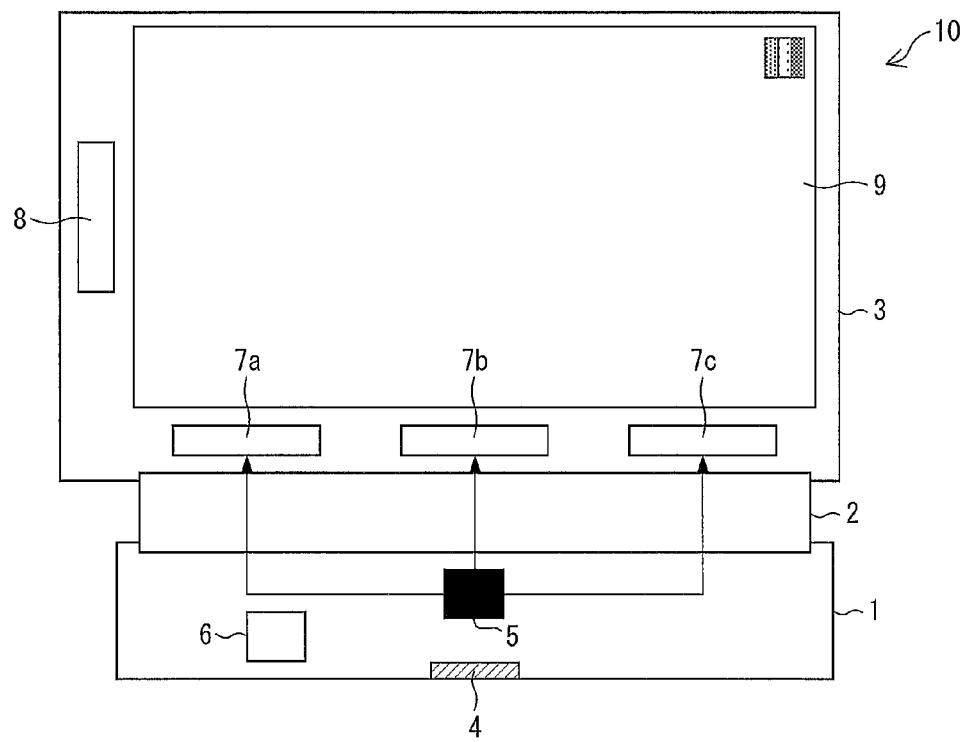
FIG. 2

First, the following description will discuss a configuration of a display device 10 of Embodiment 1, with reference to FIG. 2. FIG. 2 is a view schematically illustrating a configuration of the display device 10 in accordance with Embodiment 1. In Embodiment 1, a liquid crystal display device is employed as the display device 10. Note, however, that the present invention is not limited to this in particular.

The display device 10 includes a control substrate 1, a flexible printed circuit (FPC) substrate 2, and a display panel 3 (see FIG. 2). The control substrate 1 includes an input connector 4, a timing controller 5 (data transfer circuit), and a power supply IC 6. The display panel 3 includes source drivers 7a and 7b, a gate driver 8, and a display area 9. The control substrate 1 and the display panel 3 are connected with each other via the FPC 2.

In the control substrate 1, the input connector 4 receives display data supplied from a host (which is externally provided) and sends the display data to the timing controller 5.

The timing controller 5 transfers display data, which has been sent from the input connector 4, to the source drivers 7a through 7c. Further, the timing controller 5 controls the source drivers 7a through 7c and the gate driver 8 so as to define timing to scan and drive display elements in the display area 9. The timing controller 5 includes a transmitter circuit section (which will be described later in detail) and a lane number setting signal transmitting section (not illustrated). The power supply IC 6 generates power necessary to drive the timing controller 5, the source drivers 7a through 7c, and the gate driver 8.

The display panel 3 includes three source drivers, i.e., the source drivers 7a through 7c, as with a display panel having general resolution (1024RGB×768). In the display panel 3, each of the source drivers 7a through 7c is connected with a plurality of source bus lines, and the gate driver 8 is connected with a plurality of gate bus lines. In the display area 9, pixels are provided, in a matrix manner, at respective intersections of the source bus lines and the gate bus lines. The gate driver 8 sequentially supplies scanning signals to the gate bus lines so as to select pixels for each row. Each of the source drivers 7a through 7c writes, via the source bus lines, data signals into selected pixels. Each of the source drivers 7a through 7c includes a receiver circuit section (not illustrated) which will be later described in detail.

According to Embodiment 1, data transfer between the timing controller 5 and each of the source drivers 7a through 7c is carried out with the use of (i) a wiring group formed on the control substrate 1 and (ii) signal transmission lines in a wiring pattern formed on the FPC 2. The signal transmission lines constitute differential signal line pairs, each of which is a pair of signal transmission lines used in high-speed serial data transfer.

Figure 3:
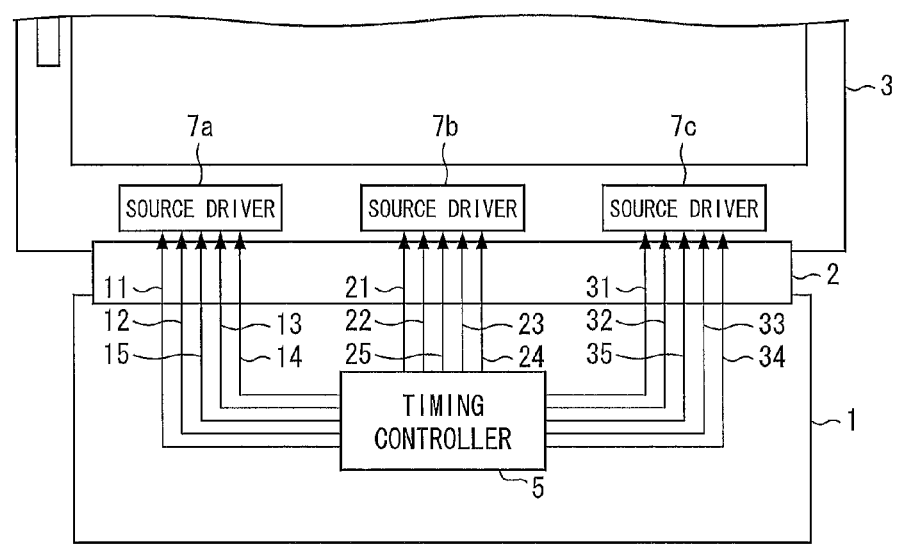
FIG. 3

FIG. 3 is a view illustrating differential signal line pairs provided between the timing controller 5 and the source drivers 7a through 7c. According to Embodiment 1, four pairs of differential signal lines (data lane) for display data transfer and one (1) pair of differential signal lines (clock lane) for clock are provided between the timing controller 5 and each of the source drivers 7a through 7c. Specifically, differential signal line pairs 11 through 14 and a differential signal line pair 15 are provided between the timing controller 5 and the source driver 7a, differential signal line pairs 21 through 24 and a differential signal line pair 25 are provided between the timing controller 5 and the source driver 7b, and differential signal line pairs 31 through 34 and a differential signal line pair 35 are provided between the timing controller 5 and the source driver 7c (see FIG. 3). Note that, in FIG. 3, one (1) pair of signal transmission line paths (data lane, clock lane) is indicated by one (1) arrow.

Although not illustrated, a lane number control signal line (LANECTRL signal line) is provided between the timing controller 5 and each of the source drivers 7a through 7c.

(Switching of Activation/Deactivation of Data Lane)

While an image is being displayed by the display device 10 of Embodiment 1, activation/deactivation of the data lanes 11 through 14, 21 through 24, and 31 through 34 connected with the source drivers 7a through 7c is controlled depending on an increased or decreased amount of display data that is transferred to the source drivers 7a through 7c during a predetermined time period.

The following description will discuss how to switch activation/deactivation of the data lanes 11 through 14, 21 through 24, and 31 through 34, with reference to FIGS. 3 through 6.

Figure 4:
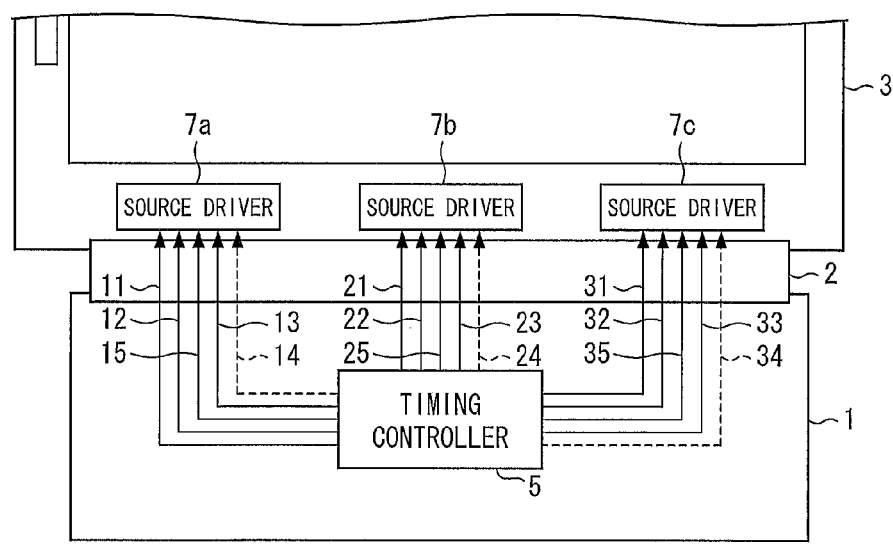
FIG. 4
Figure 5:
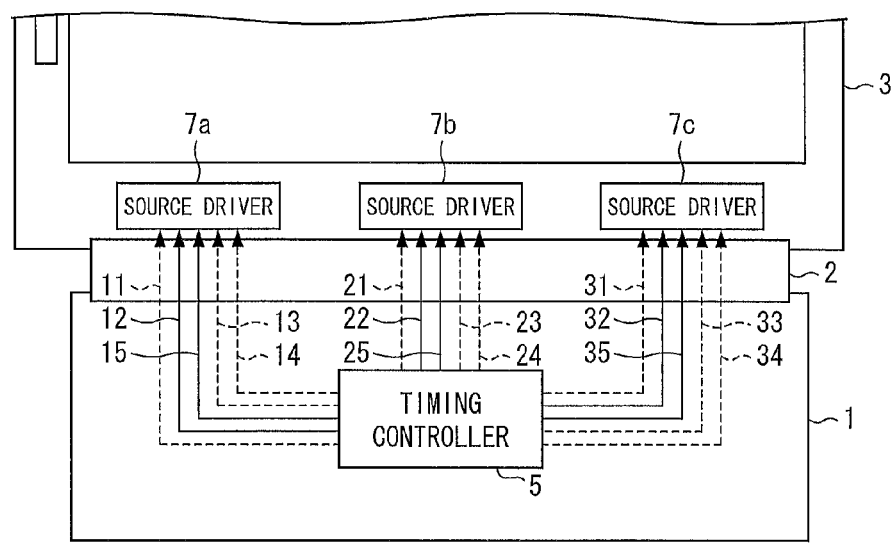
FIG. 5
Figure 6:
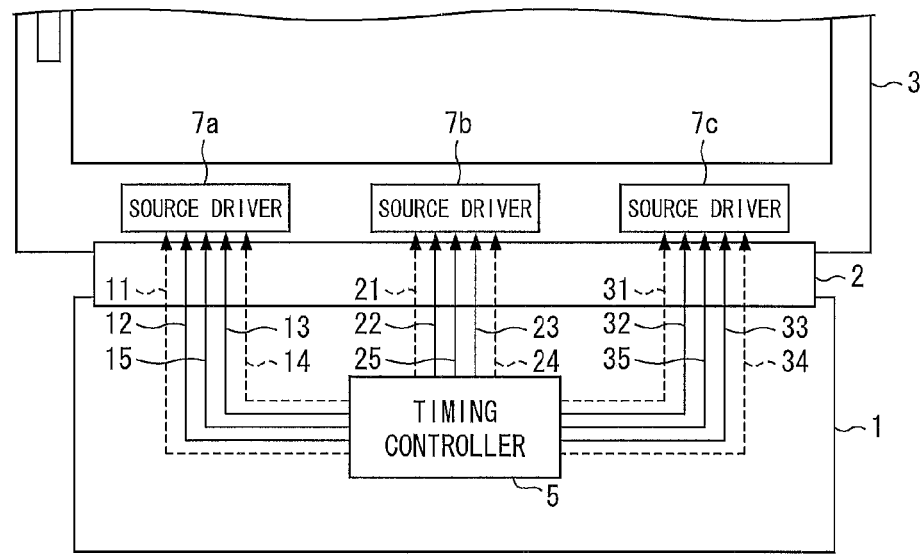
FIG. 6

Note that each of FIGS. 4 through 6 is a view illustrating the differential signal line pairs between the timing controller 5 and the source drivers 7a through 7c, as with FIG. 3. In each of FIGS. 4 through 6, one (1) pair of signal transmission line paths (data lane, clock lane) is indicated by one (1) arrow. Among the data lanes, a data lane which is used in data transfer is indicated by a solid line arrow, whereas a data lane which is not used in data transfer is indicated by a dotted line arrow.

In the following descriptions, a state in which a data lane is used in data transfer is referred to as "active state" and a state in which a data lane is not used in data transfer is referred to as "inactive state".

(Control Based on the Number of Tones)

The display device 10 of Embodiment 1 is capable of being switched (i) from an image quality (the number of tones) priority mode to an electric power priority mode and (ii) from a color image display mode to a text mode (monochrome mode). In a case where such switching is carried out, display data to be transferred, during the predetermined time period, from the timing controller 5 to the source drivers 7a through 7c is decreased in amount.

For example, in a case where the display device 10 is in the image quality (the number of tones) priority mode or in the color image display mode, the display device 10 displays each tone in 8 bits. In this case, in the display device 10, data is transferred to the source drivers 7a through 7c via all the data lanes 11 through 14, 21 through 24, and 31 through 34 which are in the active state (see FIG. 3).

In a case where the display device 10 is switched from the image quality priority mode to the electric power priority mode, information indicative of the switching is supplied to the timing controller 5. Specifically, information indicative of the number of tones (here, 6 bits) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 3) that is smaller than the currently used number (here, 4) of data lanes, because the number of tones of the image is determined to have been decreased. Then, the lane number setting signal transmitting section (i) generates an LANECTRL signal that is indicative of the determined number of data lanes and (ii) supplies the LANECTRL signal to the source drivers 7a through 7c.

The timing controller 5 and the source drivers 7a through 7c control activation/deactivation of the data lanes 11 through 14, 21 through 24, and 31 through 34 based on the LANECTRL signal. Specifically, data transfer to the source drivers 7a through 7c is carried out with the use of the active data lanes 11 through 13, 21 through 23, and 31 through 33, while the data lanes 14, 24, and 34 are in the inactive state and are not used in the data transfer (see FIG. 4). This allows reduction in power consumption.

In a case where the display device 10 is switched back to the image quality (the number of tones) priority mode or to the color image display mode, information indicative of the switching is supplied to the timing controller 5. Specifically, information indicative of the number of colors (here, 8 bits) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 4) that is larger than the currently used number (here, 3) of data lanes. Then, the lane number setting signal transmitting section (i) generates an LANECTRL signal that is indicative of the determined number of data lanes and (ii) supplies the LANECTRL signal to the source drivers 7a through 7c. The timing controller 5 and the source drivers 7a through 7c control, based on the LANECTRL signal, the data lanes 11 through 14, 21 through 24, and 31 through 34 to be returned to the state illustrated in FIG. 3. As a result, even in the case where an amount of data to be transferred is increased, the data can be transferred without problems.

(Control Based on Color Display or Monochrome Display)

In a case where the display device 10 is switched from a color display mode to a monochrome display mode, information indicative of the switching is supplied to the timing controller 5. Specifically, information indicative of the number of colors (here, 1 bit) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 1) that is smaller than the currently used number (here, 4) of data lanes, because the image display is determined to have been switched from the color display to the monochrome display. Then, the lane number setting signal transmitting section (i) generates an LANECTRL signal that is indicative of the determined number of data lanes and (ii) supplies the LANECTRL signal to the source drivers 7a through 7c.

The timing controller 5 and the source drivers 7a through 7c control, based on the LANECTRL signal, activation/deactivation of the data lanes 11 through 14, 21 through 24, and 31 through 34. Specifically, data transfer to the source drivers 7a through 7c is carried out with the use of the active data lanes 12, 22, and 32, while the data lanes 11, 13, 14, 21, 23, 24, 31, 33, and 34 are in the inactive state and are not used in the data transfer (see FIG. 5). This allows reduction in power consumption.

In a case where the display device 10 is switched back to the color image display mode, information indicative of the switching is supplied to the timing controller 5. Specifically, information indicative of the number of colors (here, 8 bits) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 4) that is larger than the currently used number (here, 1) of data lane, because the image display is determined to have been switched from the monochrome display to the color display. Then, the lane number setting signal transmitting section (i) generates an LANECTRL signal that is indicative of the determined number of data lanes and (ii) supplies the LANECTRL signal to the source drivers 7a through 7c. The timing controller 5 and the source drivers 7a through 7c control, based on the LANECTRL signal, the data lanes 11 through 14, 21 through 24, and 31 through 34 to be returned to the state illustrated in FIG. 3. As a result, even in the case where an amount of data to be transferred is increased, the data can be transferred without problems.

(Control Based on Refresh Frequency)

The display device 10 of Embodiment 1 is capable of increase a refresh frequency of the display panel in order to achieve purposes such as to (i) improve moving image visibility, (ii) switch from 2D display to 3D display, and (iii) carry out feed sequential driving. Note that, in order to switch from 2D display to 3D display, it is necessary to prepare right-eye video data and left-eye video data, and therefore the refresh frequency is doubled. The feed sequential driving is a method in which one (1) image is displayed by the use of (i) LEDs of respective three colors and (ii) three sub-fields for respective R, G, and B. In the feed sequential driving, the refresh frequency is therefore tripled.

In a case where the refresh frequency of the display panel is increased as above described, an amount of display data is increased, which is transferred from the timing controller 5 to the source drivers 7a through 7c during the predetermined time period.

For example, in a case where the display device 10 is in a 2D mode, the refresh frequency is 60 Hz. In this case, data transfer to the source drivers 7a through 7c is carried out in the display device 10 with the use of the active data lanes 12, 13, 22, 23, 32, and 33, while the data lanes 11, 14, 21, 24, 31, and 34 are in the inactive state and are not used in the data transfer (see FIG. 6).

In a case where the display device 10 is then switched to a 3D mode, information indicative of the switching is supplied to the timing controller 5. Specifically, information indicative of the refresh frequency (here, 120 Hz) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 4) that is larger than the currently used number (here, 2) of data lanes. Then, the lane number setting signal transmitting section (i) generates an LANECTRL signal that is indicative of the determined number of data lanes and (ii) supplies the LANECTRL signal to the source drivers 7a through 7c. The timing controller 5 and the source drivers 7a through 7c control, based on the LANECTRL signal, activation/deactivation of the data lanes 11 through 14, 21 through 24, and 31 through 34. Specifically, all the data lanes 11 through 14, 21 through 24, and 31 through 34 are controlled to be in the active state so that data transfer to the source drivers 7a through 7c is carried out via all the data lanes 11 through 14, 21 through 24, and 31 through 34 as illustrated in FIG. 3. As a result, even in the case where an amount of data to be transferred is increased, the data can be transferred without problems.

In a case where the display device 10 is switched back to the 2D mode, information indicative of the switching is supplied to the timing controller 5. Specifically, information indicative of the refresh frequency (here, 60 Hz) of an image to be displayed is supplied to the timing controller 5. This information is supplied from, for example, a host-side device to the display device 10. The lane number setting signal transmitting section determines, based on the information, the number of data lanes to be used in data transfer. Specifically, the lane number setting signal transmitting section sets the number of data lanes to a number (here, 2) that is smaller than the currently used number (here, 4) of data lanes. Then, the lane number setting signal transmitting section (i) generates an LANECTRL signal that is indicative of the determined number of data lanes and (ii) supplies the LANECTRL signal to the source drivers 7a through 7c. The timing controller 5 and the source drivers 7a through 7c control, based on the LANECTRL signal, the data lanes 11 through 14, 21 through 24, and 31 through 34 to be returned to the state illustrated in FIG. 6. This allows reduction in power consumption.

It is preferable that the timing controller 5 increases the number of data lanes to be used in data transfer for one (1) source driver in accordance with a ratio of increase in refresh frequency. For example, in a case where the refresh frequency is doubled, the number of data lanes to be used in data transfer is doubled. Alternatively, in a case where the refresh frequency is tripled, the number of data lanes to be used in data transfer is tripled. As such, the data lanes can be used efficiently.

(Location of Data Lane to be Deactivated)

According to the control pattern, in a case where a data lane is controlled not to be used in data transfer, it is preferable that a data lane located farther from a clock lane is more preferentially deactivated, rather than the other data lane(s) located nearer to the clock lane. For example, in a case where one to three data lanes out of the data lanes 11 through 14 connected with the source driver 7a are deactivated as illustrated in FIGS. 4 through 6, it is preferable that the data lanes 11 and 14 are preferentially deactivated, which are located farther from the clock lane 15 than the data lanes 12 and 13 are.

The data lanes 12 and 13 which are located nearer to the clock lane 15 can easily be configured to have a wire length that is identical with that of the clock lane 15. This makes it possible to easily avoid missing data due to phase shift. Under the circumstances, in a case where the lanes 12 and 13 which are located nearer to the clock lane 15 are configured to be preferentially activated, it becomes easy to cause phases of the clock lane and the active data lanes to be matched, even if a transfer rate is increased in a state where the data lanes are deactivated.

(Example of Timing Chart)

Figure 7:
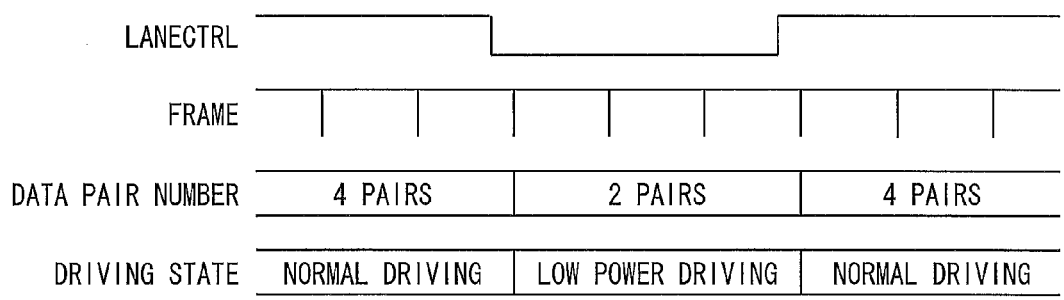
FIG. 7

FIG. 7 is a view illustrating an example of a timing chart in a case where the display device 10 is switched between the image quality (the number of tones or the number of colors) priority mode and the electric power priority mode, i.e., between a normal driving and a low power driving.

In a case where an amount of data transferred to the source drivers 7a through 7c during a predetermined time period is increased, the LANECTRL signal is shifted to a High level, whereas, in a case where the amount of data is decreased, the LANECTRL signal is shifted to a Low level (see FIG. 7). In the example illustrated in FIG. 7, the display device 10 is configured to (i) activate four data lanes when the LANECTRL signal is in the High level and (ii) activate two data lanes when the LANECTRL signal is in the Low level. The number of data lanes used in data transfer is changed at timing at which a frame is first changed after the LANECTRL signal is shifted from the High level to the Low level or is shifted from the Low level to the High level.

As such, according to Embodiment 1, the lane number setting signal transmitting section outputs an LANECTRL signal that is in the High level or in the Low level depending on increase or decrease in amount of data that is transferred during the predetermined time period. This allows the display device 10 to set an optimal number of lanes in accordance with a driving state of the display device 10. Note that the number of data lanes that is to be activated in accordance with the High or Low level of the LANECTRL signal can be set as appropriate depending on what kind of mode switching is carried out by the display device 10. In other words, the number of data lanes to be activated can be set to an optimal number in accordance with a driving state of the display device 10.

(Configuration for Carrying Out Data Transfer)

Figure 1:
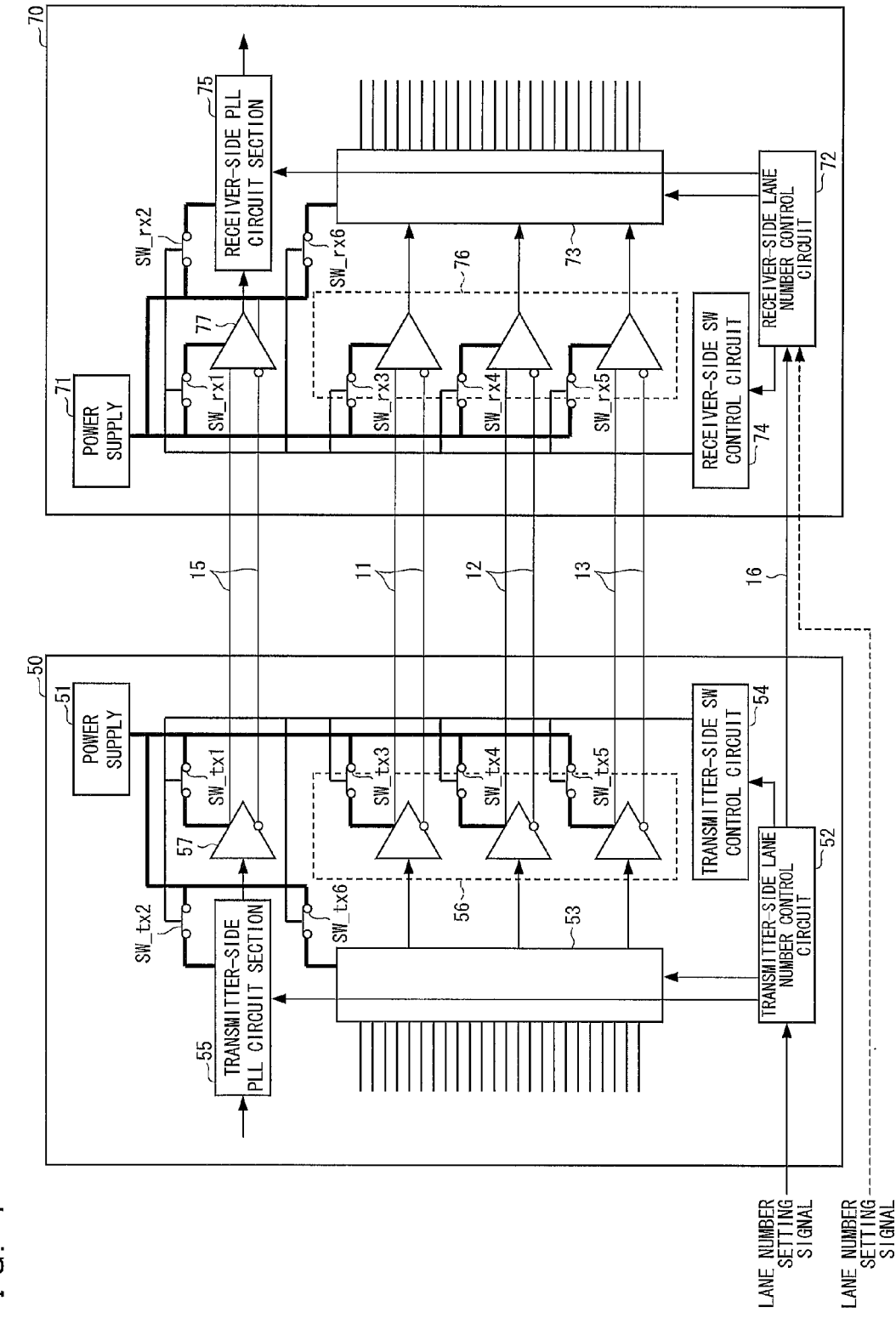
FIG. 1

In Embodiment 1, data transfer between the timing controller 5 and the source drivers 7a through 7c is carried out by driving serial bus differential signal lines with an electric current or with a voltage. The following description will discuss a configuration for carrying out the data transfer, with reference to FIG. 1. FIG. 1 is a circuit diagram illustrating a transmitter circuit section 50 included in the timing controller 5 and a receiver circuit section 70 included in the source driver 7a.

For convenience, the following description exemplifies a configuration with the use of the source driver 7a and the transmitter circuit section 50 corresponding to the source driver 7a. Note, however, that a similar explanation is applicable to a configuration employing (i) the source driver 7b and a transmitter circuit section corresponding to the source driver 7b or (ii) the source driver 7c and a transmitter circuit section corresponding to the source driver 7c.

The transmitter circuit section 50 of the timing controller 5 includes a transmitter-side lane number control circuit 52, a parallel-serial conversion section 53, a transmitter-side switch (SW) control circuit 54, a transmitter-side PLL circuit section 55, a plurality (three in FIG. 1) of data transmitter circuits 56, a clock transmitter circuit 57, and a power supply VDIF 51 for driving these circuits (see FIG. 1).

Based on an LANECTRL signal (which determines the number of lanes to be used in data transfer carried out in a next frame) supplied from a lane number setting signal transmitting section (not illustrated), the transmitter-side lane number control circuit 52 transmits (i) information, which specifies a conversion protocol, to the parallel-serial conversion section 53, (ii) a signal for controlling activation/deactivation and a frequency to the transmitter-side PLL circuit section 55, and (iii) information, which indicates a lane(s) to be used in the data transfer and a lane(s) not to be used in the data transfer, to the transmitter-side SW control circuit 54. Further, the transmitter-side lane number control circuit 52 sends the LANECTRL signal, which has been received from the lane number setting signal transmitting section (not illustrated), to the source driver 7a.

The parallel-serial conversion section 53 (i) converts parallel data, which has been supplied from a host, into serial data based on conversion-protocol-specifying information supplied from the transmitter-side lane number control circuit 52 and then (ii) transmits the serial data to the data transmitter circuit 56.

Based on information received from the transmitter-side lane number control circuit 52, the transmitter-side SW control circuit 54 controls (i) a power supply switch (SW_tx1) for the clock transmitter circuit 57, (ii) a power supply switch (SW_tx2) for the transmitter-side PLL circuit section 55, (iii) power supply switches (SW_tx3 through SW_tx5) for the respective data transmitter circuits 56, and (iv) a power supply switch (SW_tx6) for the parallel-serial conversion section 53. With the configuration, it is possible to (i) supply power to a data transmitter circuit 56 corresponding to an active data lane and (ii) prevent power from being supplied to a data transmitter circuit 56 corresponding to an inactive data lane.

The transmitter-side PLL circuit section 55 supplies, based on a clock signal supplied from the host, a clock signal to the data transmitter circuit 56 and the clock transmitter circuit 57. Further, the transmitter-side PLL circuit section 55 is controlled in terms of its activation/deactivation and its frequency by a control signal supplied from the transmitter-side lane number control circuit 52.

The data transmitter circuit 56 outputs a frequency of a differential data signal based on a clock signal supplied from the transmitter-side PLL circuit section 55, and the clock transmitter circuit 57 outputs a frequency of a differential clock signal based on a clock signal supplied from the transmitter-side PLL circuit section 55. Note that an amplitude of the differential data signal outputted by the data transmitter circuit 56 is defined by a driving voltage supplied from the power supply VDIF 51.

The receiver circuit section 70 of the source driver 7a includes a receiver-side lane number control circuit 72, a parallel-serial conversion section 73, a receiver-side switch (SW) control circuit 74, a receiver-side PLL circuit section 75, a plurality (three in FIG. 1) of data receiver circuits 76, a clock receiver circuit 77, and a power supply VDIF 71 for driving these circuits (see FIG. 1).

Based on an LANECTRL signal supplied from the transmitter-side lane number control circuit 52, the receiver-side lane number control circuit 72 transmits (i) information, which specifies a conversion protocol, to the parallel-serial conversion section 73, (ii) a control signal to the receiver-side PLL circuit section 75 for controlling activation/deactivation and a frequency of the receiver-side PLL circuit section 75, and (iii) information, which indicates a lane(s) to be used in data transfer and a lane(s) not to be used in the data transfer to the receiver-side SW control circuit 74. Note that the LANECTRL signal may be supplied from the transmitter-side lane number control circuit 52 or directly from the lane number setting signal transmitting section (not illustrated) of the timing controller 5 as indicated by a dotted line in FIG. 1.

The data receiver circuit 76 (i) carries out differential amplification with respect to the differential data signal received from the data transmitter circuit 56 and then (ii) sends an obtained data signal to the parallel-serial conversion section 73. The clock receiver circuit 77 (i) carries out differential amplification with respect to the differential clock signal received from the clock transmitter circuit 57 and then (ii) sends an obtained clock signal to the receiver-side PLL circuit section 75.

The parallel-serial conversion section 73 (i) converts serial data, which has been supplied from the data receiver circuit 76, into parallel data based on conversion-protocol-specifying information supplied from the receiver-side lane number control circuit 72 and then (ii) sends the parallel data to a subsequent circuit block.

Based on information received from the receiver-side lane number control circuit 72, the receiver-side SW control circuit 74 controls (i) a power supply switch (SW_rx1) for the clock receiver circuit 77, (ii) a power supply switch (SW_rx2) for the receiver-side PLL circuit section 75, (iii) power supply switches (SW_rx3 through SW_rx5) for the respective data receiver circuits 76, and (iv) a power supply switch (SW_rx6) for the parallel-serial conversion section 73. With the configuration, it is possible to (i) supply power to a data receiver circuit 76 corresponding to an active data lane and (ii) prevent power from being supplied to a data receiver circuit 76 corresponding to an inactive data lane.

A lane number control signal line 16 is further provided between the transmitter-side lane number control circuit 52 and the receiver-side lane number control circuit 72 (see FIG. 1) so that the data transfer can be carried out. Further, the data lanes 11 through 13, each of which is a pair of signal transmission lines, are provided between the respective data receiver circuits 76 and the respective data transmitter circuits 56, and the clock lane 15 which is a pair of signal transmission line paths is provided between the clock transmitter circuit 57 and the clock receiver circuit 77. Note that, although a configuration corresponding to the data lane 14 is not illustrated in FIG. 1, a configuration similar to those corresponding to the data lanes 11 thorough 13 may be applicable to the data lane 14.

(Operation Method)

The following description will discuss a controlling flow in an example case where the number of active data lanes for the source driver 7a is changed from four (i.e., the data lanes 11 through 14) to three (i.e., the data lanes 12 through 14).

First, the lane number setting signal transmitting section in the timing controller 5 (i) detects an increase or a decrease in amount of image data (parallel data) that is supplied from the host during a predetermined time period and then (ii) outputs an LANECTRL signal which is in a Low or High level depending on the data amount. The LANECTRL signal outputted by the lane number setting signal transmitting section is supplied to the transmitter-side lane number control circuit 52 of the transmitter circuit section 50.

The transmitter-side lane number control circuit 52 transmits information, which specifies a conversion protocol for three data lanes, to the parallel-serial conversion section 53 in response to the received LANECTRL signal. Simultaneously, the transmitter-side lane number control circuit 52 transmits information, which prevents a voltage from being supplied to one (1) data lane, to the transmitter-side SW control circuit 54.

From a next frame, the parallel-serial conversion section 53 (i) sorts pieces of parallel data, which have been received from the host, into pieces of serial data based on the conversion protocol for three data lanes and (ii) transmits the pieces of serial data to the data transmitter circuits 56. Note that, in a case where the sorting of pieces of data can be carried out without changing frequency, no special control is carried out with respect to the transmitter-side PLL circuit section 55.

The transmitter-side lane number control circuit 52 further transmits the LANECTRL signal to the receiver-side lane number control circuit 72.

Subsequently, in each of the source drivers 7a through 7c, the receiver-side lane number control circuit 72 transmits the information, which specifies the conversion protocol for three data lanes, to the parallel-serial conversion section 73 based on the received LANECTRL signal. Simultaneously, the receiver-side lane number control circuit 72 transmits information for deactivating one (1) data lane (data lane 11) to the receiver-side SW control circuit 74.

From a next frame, the parallel-serial conversion section 73 (i) sorts the pieces of serial data, which have been sent from the data receiver circuit 76, into pieces of parallel data based on the conversion protocol for three data lanes and (ii) transmits the pieces of parallel data to a subsequent circuit block. Note that, in a case where the sorting of pieces of data can be carried out without changing frequency, no special control is carried out with respect to the receiver-side PLL circuit section 75.

Then, in the timing controller 5, the transmitter-side SW control circuit 54 turns OFF the switch SW_tx5 based on received information so as to stop a power supply voltage to the data transmitter circuit 56 corresponding to the data lane 11. Similarly, in the source driver 7a, the receiver-side SW control circuit 74 turns OFF the switch SW_rx5 based on received information so as to stop a power supply voltage to the data transmitter circuit 56 corresponding to the data lane 11. As such, the number of data lanes used to carry out the data transfer is changed from four to three.

According to the operation above described, a steady-state electric current flows in an active data lane, whereas a steady-state electric current does not flow in an inactive data lane. This allows a reduction in power consumption.

(Sorting of Data)

The following description will discuss how the parallel-serial conversion section 53 of the timing controller 5 sorts pieces of data, with reference to FIGS. 8 through 11.

Note that, in the following description, it is assumed that each pixel of the display panel 3 has subpixels for respective R, G, and B, a horizontal resolution is 1024 pixels, and a vertical resolution is 768 lines. Moreover, for convenience, the following description exemplifies a configuration with the use of the source drivers 7a and 7b out of the three source drivers 7a through 7c. Note, however, that a similar explanation is applicable to a configuration employing the source driver 7c.

Figure 8:
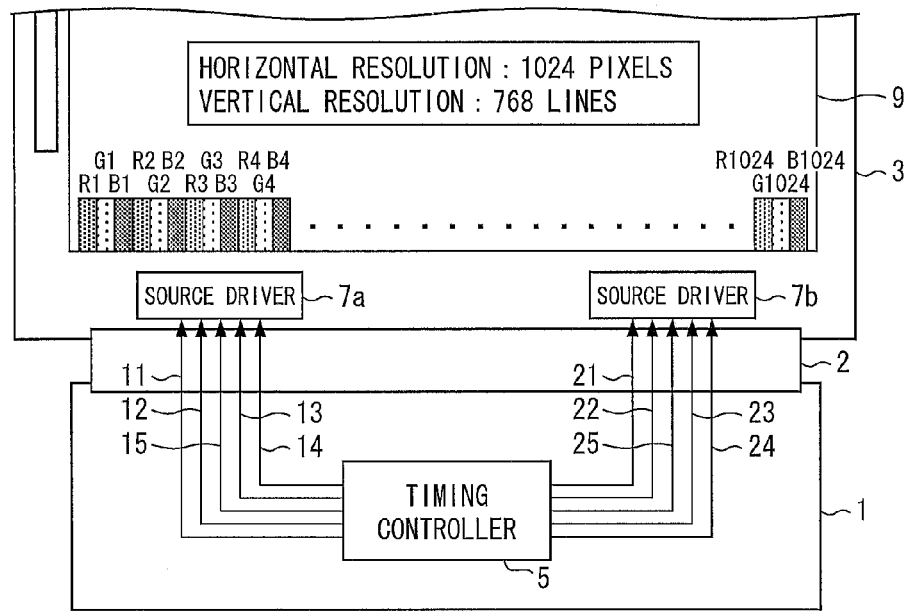
FIG. 8
Figure 9:
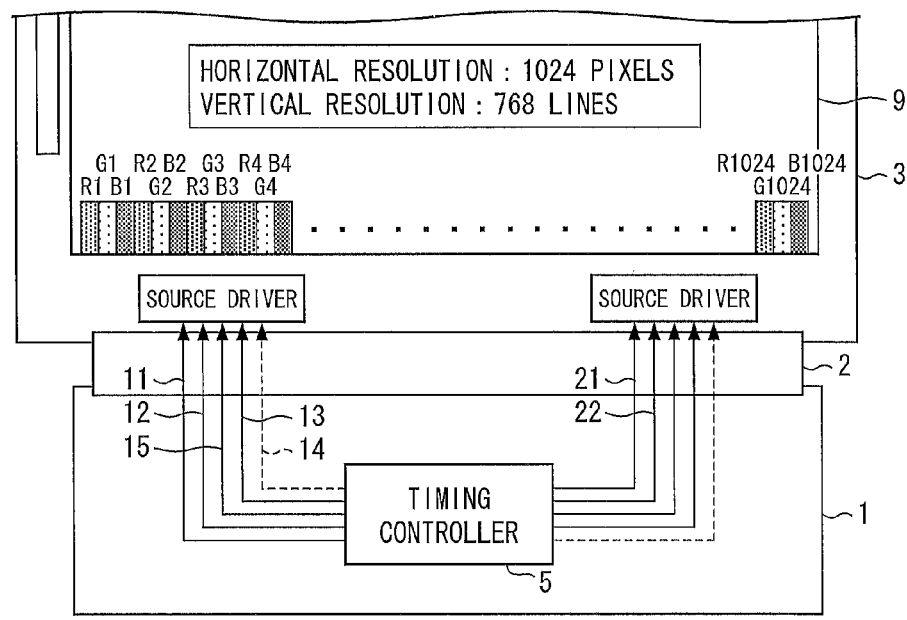
FIG. 9
Figure 10:
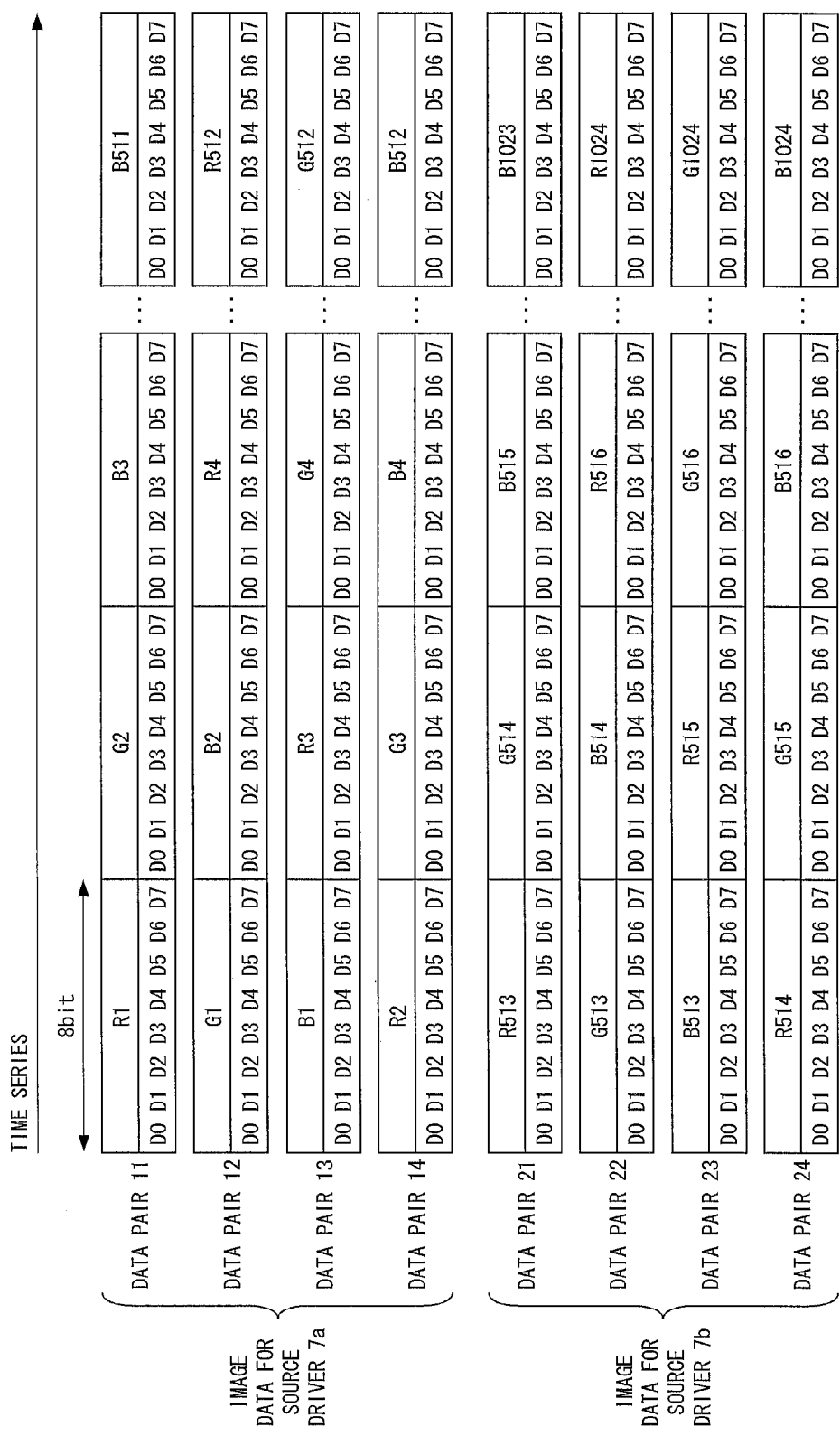
FIG. 10
Figure 11:
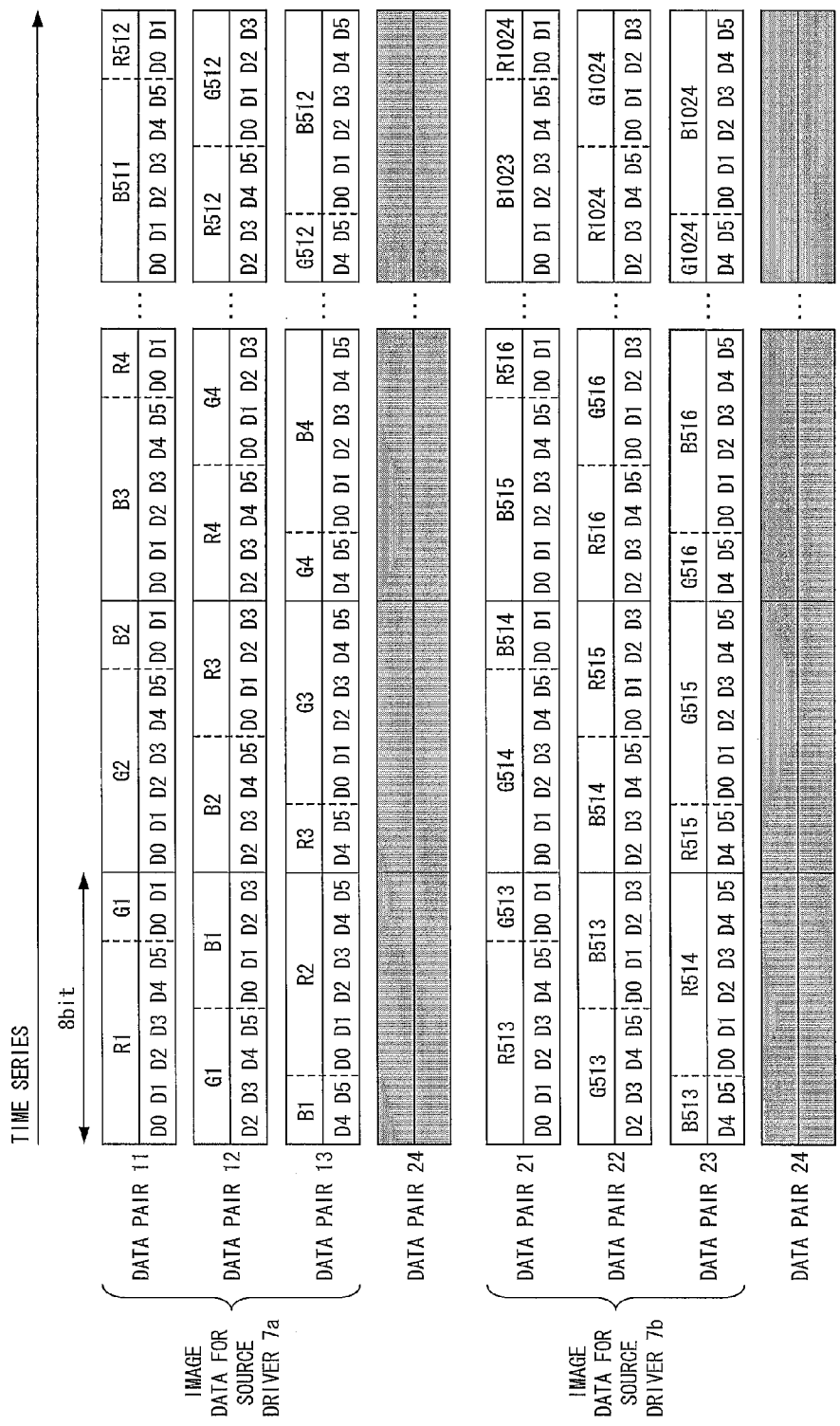
FIG. 11

Each of FIGS. 8 and 9 illustrates the data lanes 11 through 14 connected with the source driver 7a and the data lanes 21 through 24 connected with the source driver 7b. Each of FIGS. 10 and 11 is a schematic view illustrating, on a time-series basis, pieces of data that are transferred to the source drivers 7a and 7b via the data lanes 11 through 14 and 21 through 24. Here, FIGS. 8 and 10 illustrate a normal state (i.e., 8-bit tone display state), and FIGS. 9 and 11 illustrate a state in which the number of active data lanes is decreased (i.e., 6-bit tone display state).

During the 8-bit tone display state, pieces of image data for a display area, which is assigned to each of the source drivers 7a and 7b, are grouped by 8 bits and transferred with the use of the data lanes 11 through 14 and 21 through 24 (see FIGS. 8 and 10).

On the other hand, during the 6-bit tone display state, pieces of image data for a display area, which is assigned to each of the source drivers 7a and 7b, are sorted by grouping the pieces of image data by 6 bits and transferred with the use of the data lanes 11 through 13 and 21 through 23 (see FIGS. 9 and 11). In the example illustrated in FIG. 11, it is not necessary to change a clock frequency.

Note that the sorting of data illustrated in FIGS. 10 and 11 merely exemplifies Embodiment 1, and therefore Embodiment 1 is not limited to these examples. As such, the parallel-serial conversion section 53 can sort pieces of data as appropriate in accordance with the number of active data lanes.

(Main Points)

As above described, the timing controller 5 determines the number of data lanes used in data transfer, in accordance with an amount of data to be transferred during a predetermined time period (more precisely, in accordance with information in relation to data amount). Then, the timing controller 5 transfers data with the use of data lanes whose number has been thus determined. Meanwhile, data lanes that are not used in the data transfer are deactivated. That is, only data lanes necessary for the data transfer are used, and the rest of data lanes are not used. By thus deactivating the unused data lanes, it is possible to save electric power that is to be consumed when the data lanes are activated.

In the timing controller 5, each of the data lanes is controlled to be used or not to be used in data transfer. That is, a transfer rate is not changed for each data lane. In a case where a data lane is used in data transfer, the data is transferred at a normal transfer rate, whereas, in a case where a data lane is not used in data transfer, the transfer rate is set to zero. According to the configuration, it is unnecessary to provide a clock for adjusting a transfer rate for each data lane. In other words, the circuit configuration will not become complicated, as compared with a conventional technique.

As above described, the timing controller 5 brings about an effect of reducing power consumption with a simple configuration.

(Others)

In this specification, the term "predetermined time period" indicates a time period that can be set as appropriate, and is not limited to a particular time period.

In the above descriptions, all the data lanes connected with the source drivers 7a through 7c are controlled similarly. Note, however, that the data lanes may be controlled for each of the source drivers 7a through 7c. For example, in a case where a moving image is displayed on a part of the display area 9 of the display device 10 and a still image is displayed on another part of the display area 9, image data amounts are largely different for parts of the display area 9 which parts are assigned to the respective source drivers 7a through 7c. In this case, the timing controller 5 may control activation/deactivation of each data lane for each of the source drivers 7a through 7c, depending on an amount of data to be transferred to each of the source drivers 7a through 7c.

According to Embodiment 1, the display panel 3 includes three source drivers, i.e., the source drivers 7a through 7c, as with a display panel having general resolution (1024RGB× 768). Note, however, that the number of source drivers is not limited to a particular one.

[Embodiment 2]

The following description will discuss Embodiment 2 of the present invention, with reference to FIGS. 12 through 16.

Embodiment 2 is mainly different from Embodiment 1 in that, in the low power driving mode, one (1) vertical period is divided into a high-speed transfer period during which image data is transferred to the source drivers 7a through 7c and a halt period during which the image data is not transferred. In the following description, the difference is mainly discussed. Note that the same reference numerals are given to constituent members which have functions corresponding to the constituent members of Embodiment 1.

Figure 12:
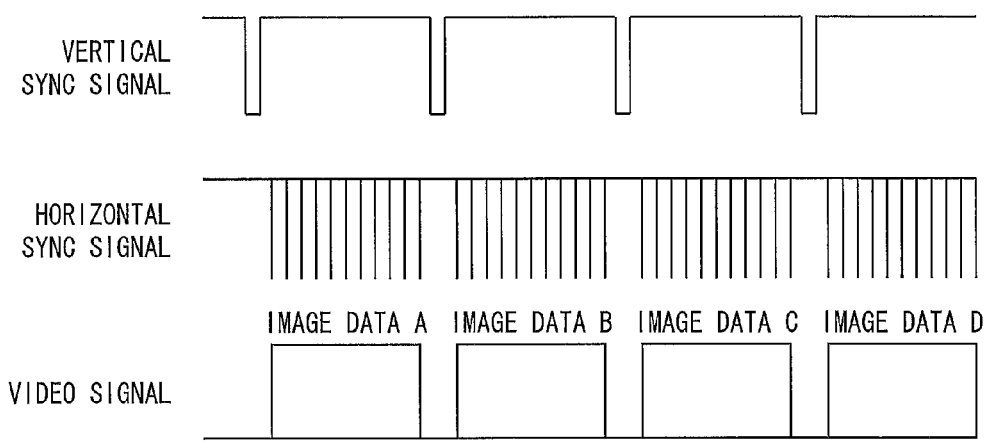
FIG. 12
Figure 13:
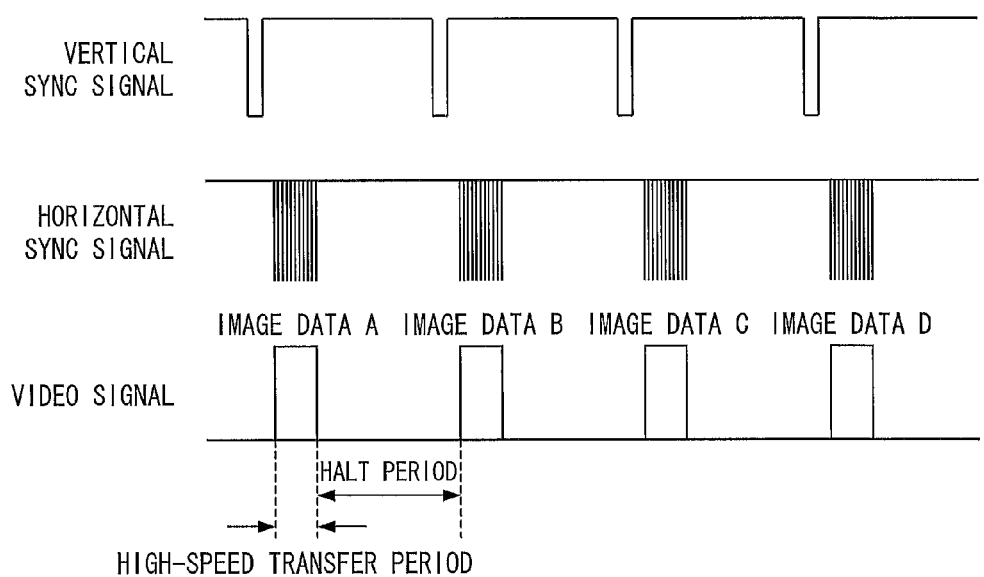
FIG. 13
Figure 14:
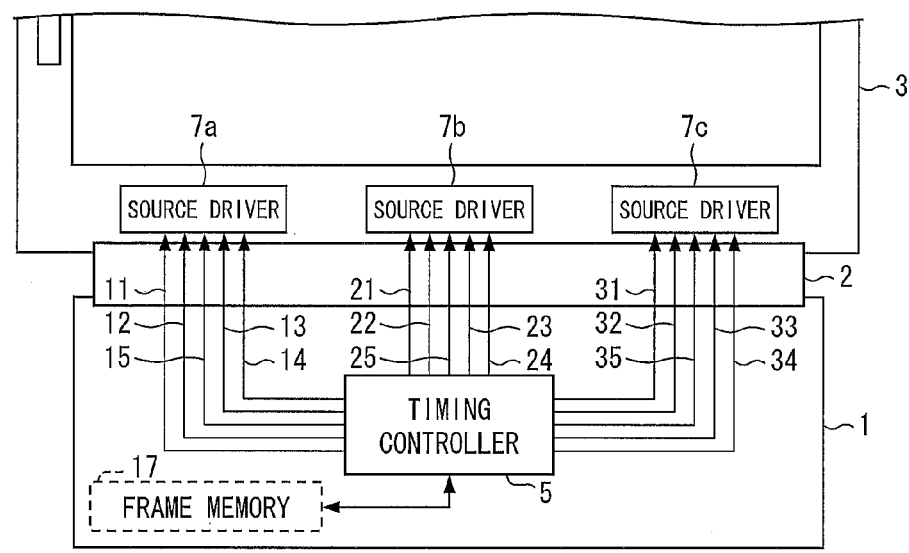
FIG. 14
Figure 15:
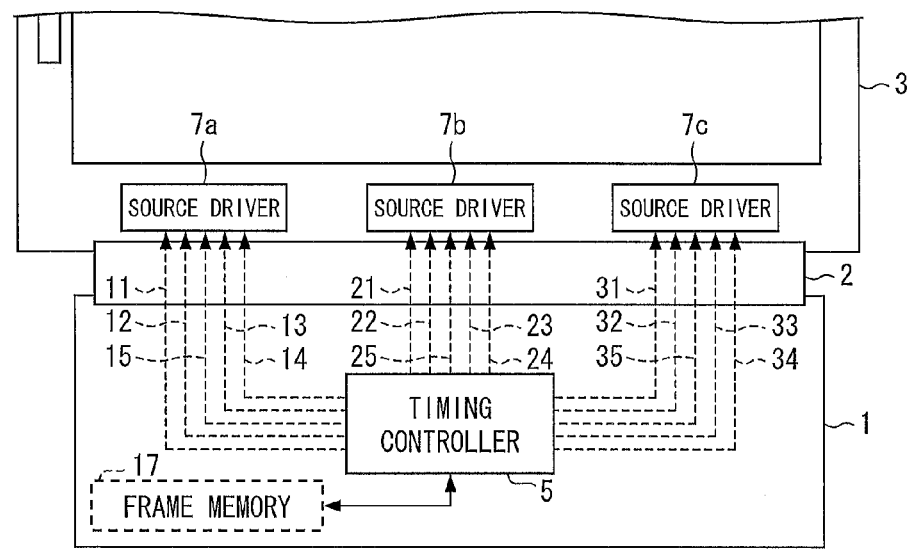
FIG. 15

FIG. 12 is a view illustrating a timing chart in a normal driving mode. FIG. 13 is a view illustrating a timing chart in a low power driving mode.

The data transmitter circuit 56 outputs a video signal based on a clock signal supplied from the transmitter-side PLL circuit section 55 (see FIGS. 12 and 13). In the low power mode illustrated in FIG. 13, a cycle of a horizontal sync signal during one (1) vertical period is shorter than that in the normal mode illustrated in FIG. 12. According to the configuration, one (1) vertical period in the low power mode is divided into a high-speed transfer period during which image data is transferred to the source drivers 7a through 7c and a halt period during which the image data is not transferred.

Information that specifies the high-speed transfer period and the halt period is supplied to the timing controller 5. The information is given, for example, from a host-side device to the display device 10. The lane number setting signal transmitting section determines, based on the information, the number of data lanes to be used in data transfer. Specifically, the lane number setting signal transmitting section determines to use all the data lanes (i.e., four data lanes) during the high-speed transfer period. Then, the lane number setting signal transmitting section (i) generates an LANECTRL signal indicative of the determined number and (ii) transmits the LANECTRL signal to the source drivers 7a through 7c. Based on the LANECTRL signal, the timing controller 5 and the source drivers 7a through 7c control all the data lanes 11 through 14, 21 through 24, and 31 through 34, which are connected with the source drivers 7a through 7c, to be in the active state (see FIG. 13).

On the other hand, during the halt period, the timing controller 5 determines to set the number of data lane, which is to be used during the halt period, to zero. Then, the timing controller 5 generates an LANECTRL signal indicative of the determined number, and supplies the LANECTRL signal to the source drivers 7a through 7c. Based on the LANECTRL signal, the timing controller 5 and the source drivers 7a through 7c control the data lanes 11 through 14, 21 through 24, and 31 through 34 to be in the inactive state (see FIG. 15). Further, in addition to the above control, the timing controller 5 and the source drivers 7a through 7c control the clock lanes 15, 25, and 35 to be in the inactive state.

(Other Example of Halt Period)

Figure 16:
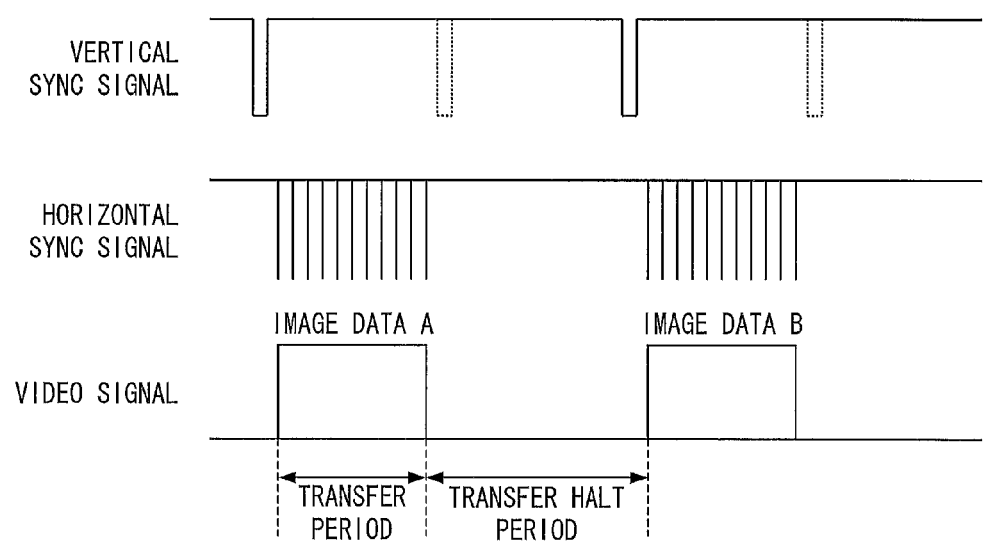
FIG. 16

In the low power mode, each one (1) vertical period may be set to be (i) a transfer period during which image data is transferred to the source drivers 7a through 7c or (ii) a halt period during which the image data is not transferred. FIG. 16 illustrates this example. FIG. 16 is a view illustrating another timing chart in the low power mode.

As illustrated in FIG. 16, the data transmitter circuit 56 outputs a video signal based on a clock signal supplied from the transmitter-side PLL circuit section 55. In the low power mode illustrated in FIG. 16, data is not transferred in all vertical periods but is transferred in each of transfer periods which are alternate vertical periods (i.e., every second vertical period), unlike the normal mode illustrated in FIG. 12. On the other hand, during each halt period between transfer periods, data is not transferred. During the halt periods, all the data lanes 11 through 14 are deactivated, and this makes it possible to reduce power consumption.

Note that the transfer period and the halt period are not limited to the cycle in which the transfer period and the halt period are switched for each one (1) vertical period. For example, a cycle of one transfer period and two halt periods may be employed.

According to the control method of Embodiment 2, it is possible to set the display device 10 to have the normal driving mode and the low power driving mode so that the number of active data lanes can be optimally set in accordance with the driving mode. This suitably allows the display device 10 to reduce power consumption.

In a case where the operation method of Embodiment 2 is carried out, the method can be carried out in the following two manners.

(1) One (1) vertical period is divided into the high-speed transfer period and the halt period, and a video signal is supplied from the host to the timing controller 5 during the high-speed transfer period.

(2) The host supplies a video signal to the timing controller 5 at a normal timing, and the image data is once stored in a frame memory 17 of the control substrate 1. The timing controller 5 (i) reads out the data stored in the frame memory 17 at a high speed and (ii) transfers the data to the source drivers 7a through 7c at a high speed.

(Control of Output Circuit)

The display device 10 of Embodiment 2 may further include a performance lowering section (not illustrated) which lowers a performance of an output circuit that is provided in each of the source drivers 7a and 7b and supplies an analog voltage to the display panel 3 during the halt period. According to the configuration, the display device 10 (i) deactivates all the data lanes and (ii) lowers the performance of the output circuits during the halt period. This allows reduction in power consumed by the output circuits, and accordingly it is possible to further reduce power consumption of the entire display device 10.

[Embodiment 3]

Figure 17:
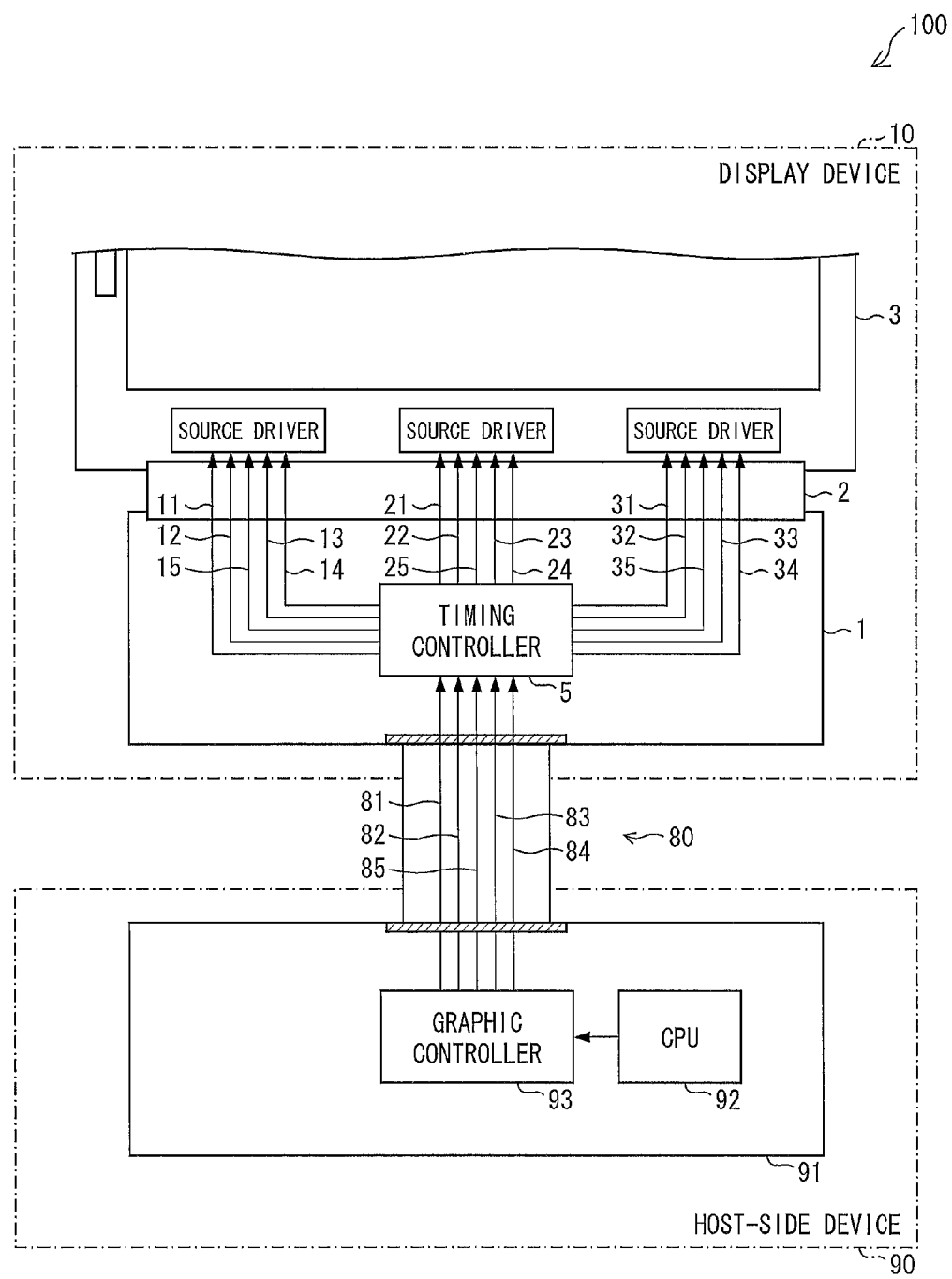
FIG. 17
Figure 18:
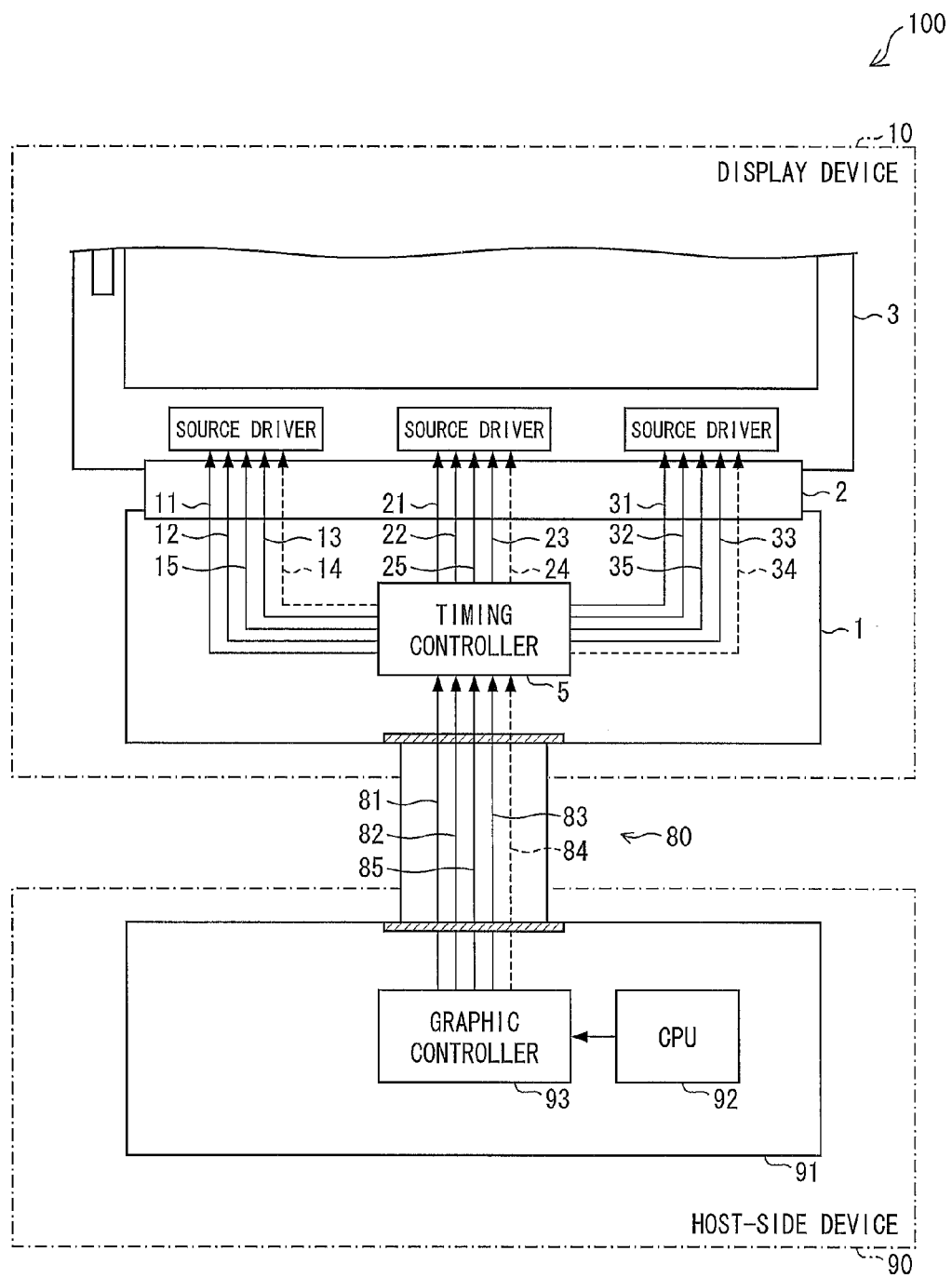
FIG. 18

The following description will discuss Embodiment 3 of the present invention, with reference to FIGS. 17 and 18. For convenience, the same reference numerals are given to constituent members which have functions corresponding to the constituent members of Embodiment 1, and explanations of such constituent members are sometimes omitted.

First, the following description will briefly discuss a configuration of a display system 100 of Embodiment 3, with reference to FIG. 17. FIG. 17 is a plane view schematically illustrating a configuration of the display system 100 of Embodiment 3.

The display system 100 of Embodiment 3 (i) includes a display device 10 and a host-side device 90 that is connected with the display device 10 and (ii) is configured as a so-called electronic apparatus (see FIG. 17). Because of having a configuration similar to that described in Embodiment 1 or 2, the explanation is omitted. The host-side device 90 includes a control substrate 91, a CPU 92, and a graphic controller 93. The display device 10 and the host-side device 90 are connected with each other via a cable 80. The cable 80 may be an FFC cable or a fine-line coaxial cable.

The host-side device 90 transfers image data to the display device 10 via the cable 80. Specifically, the graphic controller 93 of the host-side device 90 transfers display data to a timing controller 5 of the display device 10. This data transfer is carried out with (i) wiring sets formed on the respective control substrates 1 and 91 and (ii) signal transmission lines arranged in a wiring pattern formed on the cable 80. The signal transmission lines constitute differential signal line pairs, each of which is a pair of signal transmission lines used in high-speed serial data transfer.

In Embodiment 3, four differential signal line pairs (data lanes) 81 through 84 for display data transfer and one (1) differential signal line pair (clock lane) 85 for clock are provided between the graphic controller 93 and the timing controller 5 (see FIG. 17). Further, although not illustrated, a lane number control signal line (LANECTRL signal line) is provided so as to connect the graphic controller 93 with the timing controller 5. Note that, in FIG. 17, each one pair of signal transmission line paths (data lane, clock lane) is indicated by one (1) arrow.

(Switching of Activation/Deactivation of Data Lane)

In Embodiment 3, while the image data is being transferred, activation/deactivation of the data lanes 81 through 84 is controlled depending on an increased or decreased amount of display data that is transferred to the timing controller 5 during a predetermined time period. The following description will discuss how to switch activation/deactivation of the data lanes 81 through 84, with reference to FIGS. 17 and 18.

Note that FIG. 18 is a view illustrating the data lanes 81 through 84 and the clock lane 85 provided between the graphic controller 93 and the timing controller 5. In FIG. 18, each of the data lanes 81 through 84 and the clock lane 85, i.e., each one (1) pair of signal transmission line paths is indicated by one (1) arrow. Among the data lanes, a data lane which is used in data transfer is indicated by a solid line arrow, whereas a data lane which is not used in data transfer is indicated by a dotted line arrow.

The host-side device 90 of Embodiment 3 has (i) a function to transfer image data in which each of tones of R, G, and B is 8 bits and (ii) a function to transfer image data in which each of tones of R, G, and B is 6 bits. In a case where the functions are switched, an amount of display data, which is transferred from the graphic controller 93 to the timing controller 5 during a predetermined time period, is increased or decreased.

For example, in a case where the host-side device 90 transfers image data, in which each of tones of R, G, and B is 8 bits, to the timing controller 5, all the four data lanes 81 through 84 are in the active state and the image data is transferred with the use of the data lanes 81 through 84 (see FIG. 17).

In a case where the host-side device 90 is switched to a mode for transferring image data in which each of tones of R, G, and B is 6 bits, information indicative of the switching is supplied to the graphic controller 93. Specifically, the graphic controller 93 receives information that is indicative of a bit number (here, 6 bits) of data to be transferred. The information is generated by the host-side device 90. For example, in a case where (i) a user changes the number of tones of an image to 6 bits or (ii) an application that deals with image data of 6 bits is executed, the information is generated and given to the graphic controller 93. A lane number setting signal transmitting section (not illustrated) in the graphic controller 93 determines, based on the information, the number of data lanes to be used in data transfer. Specifically, the lane number setting signal transmitting section determines that the bit number of the image data has been decreased, and therefore the lane number setting signal transmitting section sets the number of data lanes to a number (here, 3) that is smaller than the currently used number (here, 4) of data lanes. Then, the lane number setting signal transmitting section (i) generates an LANECTRL signal that is indicative of the determined number of data lanes and (ii) supplies the LANECTRL signal to the timing controller 5. The graphic controller 93 and the timing controller 5 control, based on the LANECTRL signal, (i) the three data lanes 81 through 83 to be activated for carrying out the data transfer and (ii) the one (1) data lane 84 to be deactivated so as not to be used in the data transfer (see FIG. 18).

In a case where the host-side device 90 is switched back to the mode for transferring image data in which each of tones of R, G, and B is 8 bits, information indicative of the switching is supplied to the graphic controller 93. Specifically, the graphic controller 93 receives information that is indicative of a bit number (here, 8 bits) of data to be transferred. The information is generated by the host-side device 90. For example, in a case where (i) a user changes the number of tones of an image to 8 bits or (ii) an application that deals with image data of 8 bits is executed, the information is generated and given to the graphic controller 93. The lane number setting signal transmitting section in the graphic controller 93 determines, based on the information, the number of data lanes to be used in data transfer. Specifically, the lane number setting signal transmitting section determines that the bit number of the image data has been decreased, and therefore the lane number setting signal transmitting section sets the number of data lanes to a number (here, 4) that is larger than the currently used number (here, 3) of data lanes. Then, the lane number setting signal transmitting section (i) generates an LANECTRL signal that is indicative of the determined number of data lanes and (ii) supplies the LANECTRL signal to the timing controller 5. The graphic controller 93 and the timing controller 5 control, based on the LANECTRL signal, the data lanes 81 through 84 to be returned to the state as illustrated in FIG. 16.

Note that, in order to carry out the data transfer, the graphic controller 93 and the timing controller 5 include a transmitter circuit section 50 and a receiver circuit section 70, respectively, which have been described in Embodiment 1.

According to Embodiment 3, it is possible to reduce power consumption in the entire display system 100 that includes the host-side device 90 and the display device 10.

[Embodiment 4]

Figure 19:
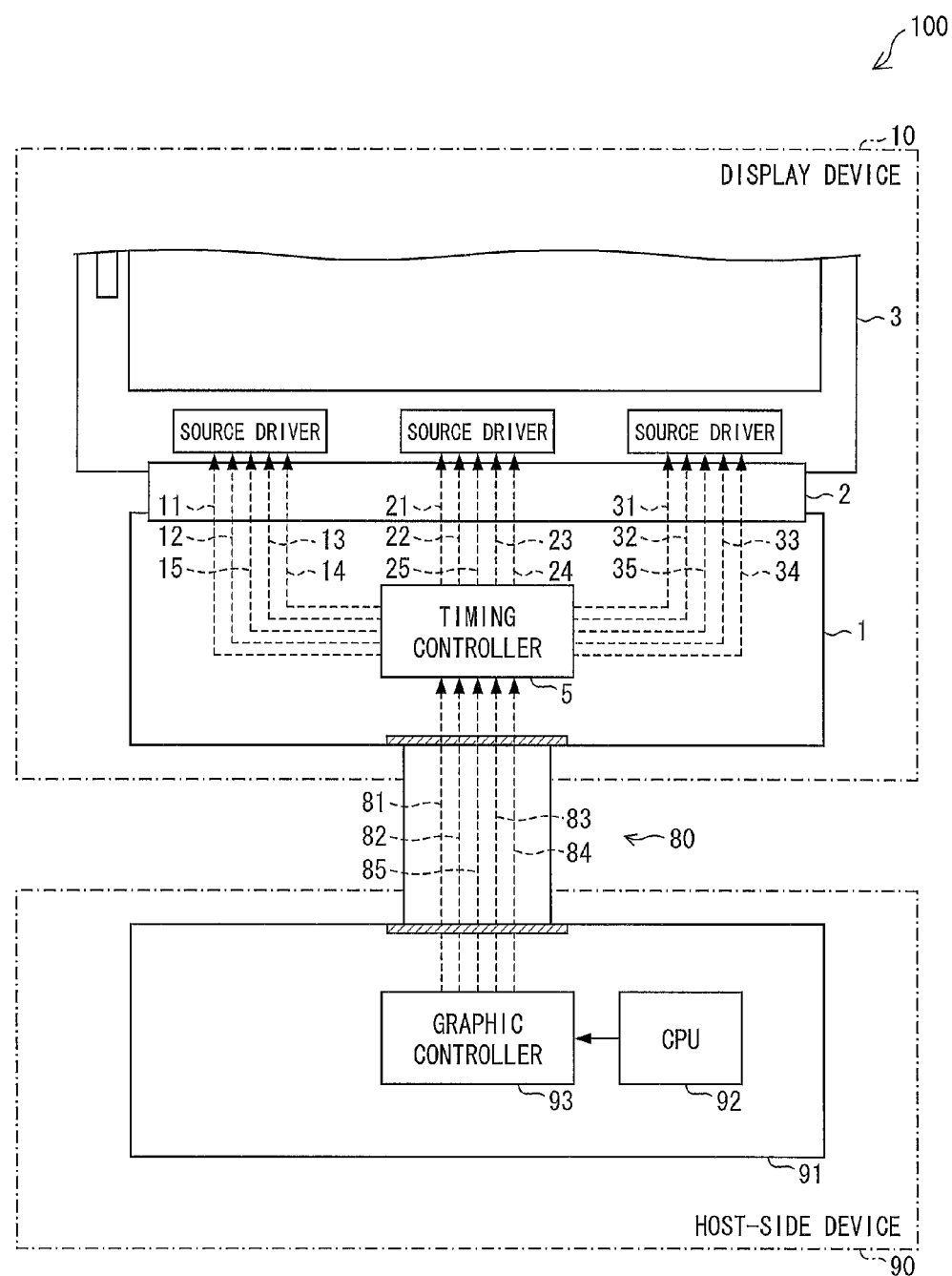
FIG. 19

The following description will discuss Embodiment 4 of the present invention, with reference to FIG. 19. For convenience, the same reference numerals are given to constituent members which have functions corresponding to the constituent members of Embodiment 1, and explanations of such constituent members are sometimes omitted.

A display system 100 of Embodiment 4 has a configuration identical with that of Embodiment 2, which is illustrated in FIG. 17. However, in Embodiment 4, the display system 100 carries out switching between a normal driving mode and a low power consumption mode which have been described in Embodiment 1. In this case, activation/deactivation of data lanes in each of the modes is controlled by both the display device 10 and the host-side device 90.

For example, in a case where the display device 10 operates in the normal driving mode illustrated in FIG. 12, the host-side device 90 similarly operates in the normal driving mode. In this case, the timing controller 5 activates all the data lanes as illustrated in FIG. 17. Further, the graphic controller 93 also activates all the data lanes.

On the other hand, in a case where the display device 10 operates in the low power consumption mode illustrated in FIG. 13, the host-side device 90 similarly operates in the low power consumption mode. Specifically, during a transfer period in one (1) vertical period, the timing controller 5 transfers image data to the source drivers 7a through 7c with the use of all the data lanes. Meanwhile, during a halt period in one (1) vertical period, all the data lanes are deactivated, and image data is not transferred to the source drivers. Similarly, during a transfer period in one (1) vertical period, the graphic controller 93 transfers image data to the timing controller 5 with the use of all the data lanes. Meanwhile, during a halt period in one (1) vertical period, all the data lanes are deactivated, and image data is not transferred to the timing controller 5.

Alternatively, in a case where the display device 10 operates in the low power consumption mode illustrated in FIG. 16, the host-side device 90 similarly operates in the low power consumption mode. Specifically, during one (1) vertical period which is a transfer period, the timing controller 5 transfers image data to the source drivers 7a through 7c with the use of all the data lanes. Meanwhile, during one (1) vertical period which is a halt period, all the data lanes are deactivated, and image data is not transferred to the source drivers 7a through 7c. Similarly, during one (1) vertical period which is a transfer period, the graphic controller 93 transfers image data to the timing controller 5 with the use of all the data lanes. Meanwhile, during one (1) vertical period which is a halt period, all the data lanes are deactivated, and image data is not transferred to the timing controller 5.

Consequently, the display system 10 operates as illustrated in FIG. 17 during the transfer period, whereas operates as illustrated in FIG. 19 during the halt period. FIG. 19 is a view for explaining activation/deactivation of serial signal transmission lines in the display system 100.

During a halt period in which image data is not transferred, the display system 10 deactivates (i) all the data lines for transferring image data to the source drivers 7a through 7c and (ii) all the data lines for transferring data to the timing controller 5. On the other hand, during a transfer period, the data lines for transferring data to the source drivers 7a through 7c and the data lines for transferring data to the timing controller 5 are activated so that data is transferred. This allows a frequency, at which image data supplied from the host-side device 90 is written into the frame memory 17, to be equal to a frequency at which the image data is read out from the frame memory 17. As a result, a clock signal, which is used to transfer image data from the host-side device 90 to the display device 10, can be used as a clock signal that is used to read out image data from the frame memory 17 in the display device 10. Therefore, it is not necessary to additionally provide a clock generation circuit for generating a new clock signal.

Further, it is possible to shorten (i) time required for writing image data into the frame memory 17 and (ii) time required for reading out image data from the frame memory 17. This makes it drastically easy to eliminate a time period during which writing of data into the frame memory and reading-out of data from the frame memory are concurrently carried out. This makes it possible to prevent a screen tearing from occurring.

[Embodiment 5]

Figure 20:
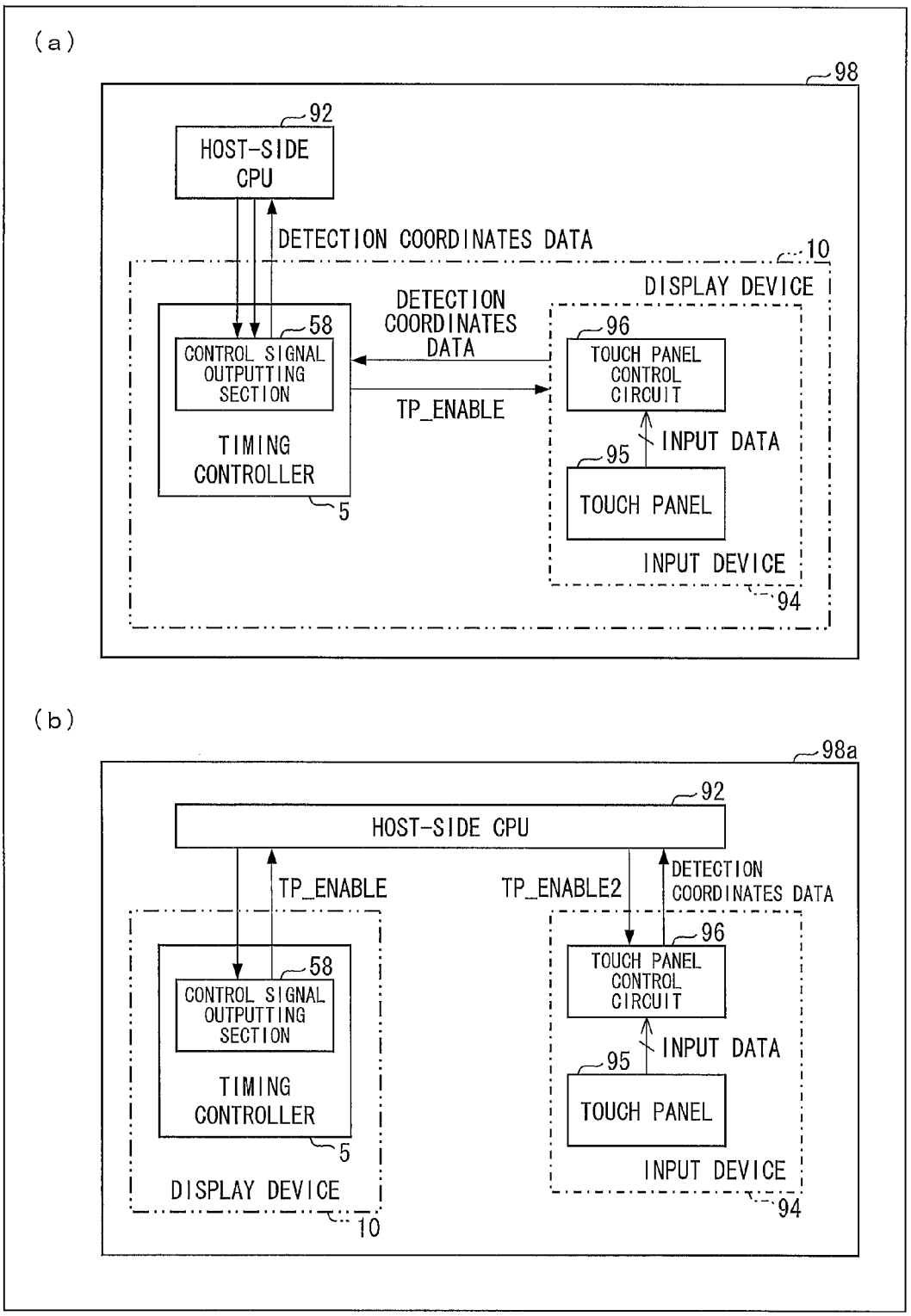
FIG. 20
Figure 21:
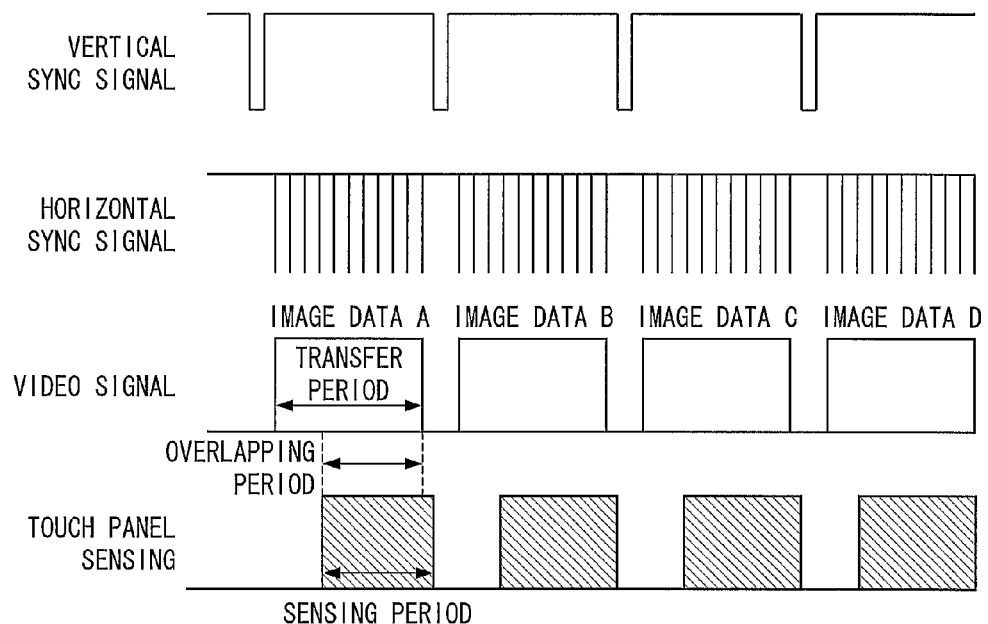
FIG. 21
Figure 22:
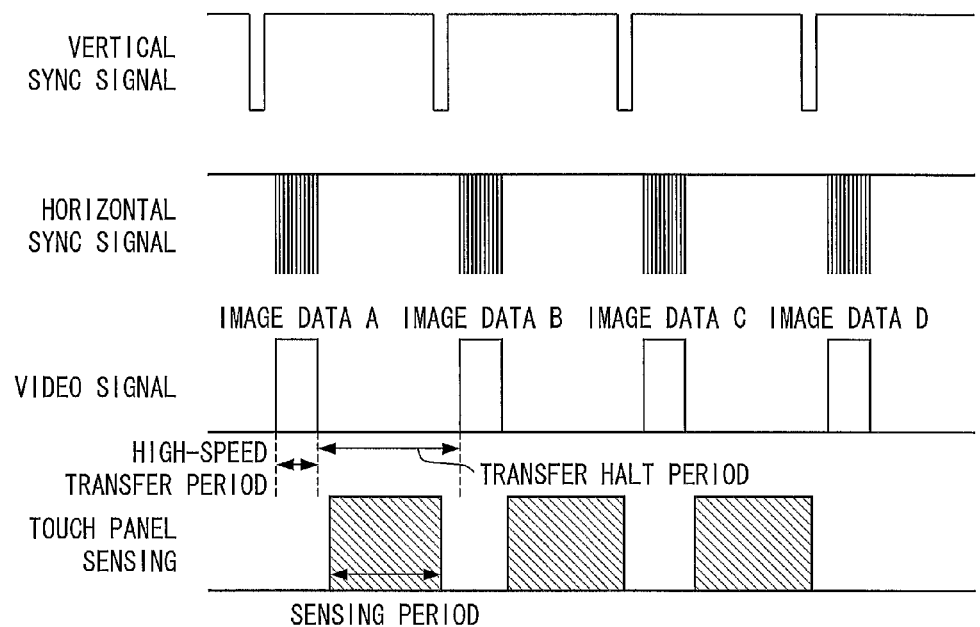
FIG. 22

The following description will discuss Embodiment 5 of the present invention, with reference to FIGS. 20 through 22. For convenience, the same reference numerals are given to constituent members which have functions corresponding to the constituent members of Embodiment 1, and explanations of such constituent members are sometimes omitted.

FIG. 20 is a block diagram illustrating a configuration of an electronic apparatus of Embodiment 5. The electronic apparatus of Embodiment 5 is, for example, configured as an electronic apparatus 98 illustrated in (a) of FIG. 20. In an example illustrated in (a) of FIG. 20, the electronic apparatus 98 includes a display device 10, an input device 94, and a host-side device 90 (not illustrated). The input device 94 is provided in the display device 10. The input device 94 includes a touch panel 95 and a touch panel control circuit 96. The timing controller 5 includes a control signal outputting section 58. The touch panel 95 is, for example, a capacitance touch panel or an electromagnetic induction touch panel.

The touch panel control circuit 96 of the input device 94 carries out sensing of the touch panel 95. With the configuration, the touch panel 95 (i) generates input data in relation to a location on the touch panel 95 which location has been touched by a user and then (ii) transmits the input data to the touch panel control circuit 96. The touch panel control circuit 96 (i) generates, based on the input data, detection coordinates data indicative of coordinates detected in the touch panel 95 and then (ii) transmits the detection coordinates data to the timing controller 5. The timing controller 5 transmits the detection coordinates data, which has been thus received, to a host-side CPU 92. Accordingly, the host-side device 90 carries out a process based on the received detection coordinates data.

The control signal outputting section 58 in the timing controller 5 generates a signal TP_ENABLE and transmits the signal TP_ENABLE to the input device 94. The signal TP_ENABLE is a signal for instructing the touch panel 95 to carry out sensing. While the signal TP_ENABLE is being supplied, the touch panel control circuit 96 carries out sensing of the touch panel 95.

The electronic apparatus 98 of Embodiment 5 operates in a normal driving mode or in a low power mode. FIG. 21 is a view illustrating a timing chart in a case where the electronic apparatus 98 is in the normal driving mode. FIG. 22 is a view illustrating a timing chart in a case where the electronic apparatus of Embodiment 5 of the present invention is in the low power mode.

As illustrated in FIG. 21, in a case where the electronic apparatus 98 operates in the normal driving mode, the timing controller 5 transfers image data to the source drivers 7a through 7c in each one (1) vertical period. That is, all the vertical periods are transfer periods. The input device 94 carries out sensing of the touch panel 95 during a sensing period in one (1) vertical period. From this, in the normal driving mode, the transfer period, during which image data is transferred, overlaps with the sensing period during which sensing of the touch panel 95 is carried out. During this overlapping period, accuracy in sensing is deteriorated due to a noise that is caused when image data is transferred.

The electronic apparatus 98 can avoid, in the low power mode, the problem of deterioration in sensing accuracy. As illustrated in FIG. 22, in a case where the electronic apparatus 98 operates in the low power mode, the timing controller 5 transfers image data to the source drivers 7a through 7c with the use of all the data lanes during a high-speed transfer period in one (1) vertical period. On the other hand, during a halt period in one (1) vertical period, all the data lanes are deactivated, and image data is not transferred to the source drivers 7a through 7c. In this case, the touch panel control circuit 96 does not carry out sensing of the touch panel 95 during the high-speed transfer period, whereas carries out sensing of the touch panel 95 during the halt period. That is, the touch panel control circuit 96 carries out sensing of the touch panel 95 while avoiding a time period during which image data is transferred. With the configuration, it is possible to prevent a noise, which is caused by data transfer, from being mixed to the sensing of the touch panel 95. This allows an improvement in sensing accuracy.

The electronic apparatus of Embodiment 5 may be configured as an electronic apparatus 98a illustrated in (b) of FIG. 21. In an example illustrated in (b) of FIG. 20, the electronic apparatus 98a includes a display device 10, an input device 94, and a host-side device 90 (not illustrated). The input device 94 is not provided in the display device 10, i.e., is provided separately from the display device 10. A control signal outputting section 58 in the timing controller 5 generates a signal TP_ENABLE and transmits the signal TP_ENABLE to a host-side CPU 92. The signal TP_ENABLE is a signal for instructing the touch panel 95 to carry out sensing. The host-side CPU 92 (i) generates a signal TP_ENABLE2 based on the received signal TP_ENABLE and (ii) transmits the signal TP_ENABLE2 to the input device 94. The signal TP_ENABLE2 is a signal for instructing the touch panel 95 to carry out sensing, as with the signal TP_ENABLE. While the signal TP_ENABLE2 is being supplied, the touch panel control circuit 96 carries out sensing of the touch panel 95.

The present invention is not limited to the embodiments, but can be altered by a skilled person in the art within the scope of the claims. An embodiment derived from a proper combination of technical means disclosed in respective different embodiments is also encompassed in the technical scope of the present invention.

(Recapitulation of Present Invention)

According to the data transfer circuit of an aspect of the present invention, it is preferable that the data is indicative of an image to be displayed on a display panel.

It is preferable that the information is indicative of the number of tones of the image; and, in a case where the determining means determines, based on the information, that the number of tones of the image has been decreased, the determining means sets the number of data lanes to a smaller number.

According to the configuration, the number of data lanes to be used in data transfer is decreased when the number of tones of the image to be displayed is decreased. This allows a reduction in power consumption.

According to the data transfer circuit of an aspect of the present invention, it is preferable that the information is indicative of the number of tones of the image; and, in a case where the determining means determines, based on the information, that the number of tones of the image has been increased, the determining means sets the number of data lanes to a larger number.

According to the configuration, the number of data lanes to be used in data transfer is increased when the number of tones of the image to be displayed is increased. In a case where the number of tones of the image is increased, an amount of data indicative of the image is accordingly increased. Therefore, the data transfer circuit can transfer data normally, even in a case where an amount of data to be transferred is increased.

According to the data transfer circuit of an aspect of the present invention, it is preferable that the information is indicative of the number of colors of the image; and, in a case where the determining means determines, based on the information, that the number of colors of the image has been decreased from the number of colors for a color display to the number of colors for a monochrome display, the determining means sets the number of data lanes to a smaller number.

According to the configuration, in a case where an image to be displayed is changed from a color image to a monochrome image, the number of data lanes to be used in data transfer is decreased. This allows a reduction in power consumption.

According to the data transfer circuit of an aspect of the present invention, it is preferable that the information is indicative of the number of colors of the image; and, in a case where the determining means determines, based on the information, that the number of colors of the image has been increased from the number of colors for a monochrome display to the number of colors for a color display, the determining means sets the number of data lanes to a larger number.

According to the configuration, in a case where an image to be displayed is changed from a monochrome image to a color image, the number of data lanes to be used in data transfer is increased. In a case where an image to be displayed is changed from a monochrome image to a color image, an amount of data indicative of the image is accordingly increased. Therefore, the data transfer circuit can transfer data normally, even in a case where an amount of data to be transferred is increased.

According to the data transfer circuit of an aspect of the present invention, it is preferable that the information is indicative of a refresh frequency of the display panel; and, in a case where the determining means determines, based on the information, that the refresh frequency has been decreased, the determining means sets the number of data lanes to a smaller number.

According to the configuration, in a case where the refresh frequency of the display panel is decreased, the number of data lanes to be used in data transfer is decreased. This allows a reduction in power consumption.

According to the data transfer circuit of an aspect of the present invention, it is preferable that the information is indicative of a refresh frequency of the display panel; and, in a case where the determining means determines, based on the information, that the refresh frequency has been increased, the determining means sets the number of data lanes to a larger number.

According to the configuration, in a case where a refresh frequency of the display panel is increased, the number of data lanes to be used in data transfer is increased. In a case where the refresh frequency of the display panel is increased, an amount of data indicative of the image is accordingly increased. Therefore, the data transfer circuit can transfer data normally, even in a case where an amount of data to be transferred is increased.

The data transfer circuit of an aspect of the present invention further includes a clock lane, the deactivating means more preferentially deactivating a data lane, which is located farther from the clock lane, out of the plurality of data lanes.

According to the configuration, a data lane, which is nearer to the clock lane, is more preferentially used in data transfer. As the data lane use in the data transfer is located nearer to the clock lane, it becomes easier to configure the data lane to have a wire length that is identical with that of the clock lane. This makes it possible to easily avoid missing data due to phase shift.

According to the data transfer circuit of an aspect of the present invention, it is preferable that one (1) vertical period for displaying the image is divided into (i) a transfer period during which the data is transferred to a source driver and (ii) a halt period during which the data is not transferred; the information defines the transfer period and the halt period; and the determining means sets the number of data lanes to zero during the halt period.

According to the configuration, all the data lanes are deactivated during the halt period in one (1) vertical period. This allows a maximum reduction in power consumption.

According to the data transfer circuit of an aspect of the present invention, it is preferable that one (1) vertical period for displaying the image is (i) a transfer period during which the data is transferred to a receiver circuit or (ii) a halt period during which the data is not transferred; the information defines the transfer period and the halt period; and the determining means sets the number of data lanes to zero during the halt period.

According to the configuration, all the data lanes are deactivated during the one (1) vertical period which is the halt period. This allows a maximum reduction in power consumption.

It is preferable that the data transfer circuit is provided in a display device and serves as a timing controller for transferring data, which is indicative of the image, to a source driver.

According to the configuration, it is possible to provide the timing controller that can reduce power consumption by changing the number of used data lanes in accordance with a transfer rate of image data.

According to the data transfer circuit of an aspect of the present invention, it is preferable that the data transfer circuit is provided in a host-side device that is connected with a display device; and the data transfer circuit serves as a graphic controller for transferring the image data to a timing controller included in the display device.

According to the configuration, it is possible to provide the graphic controller that can reduce power consumption by changing the number of used data lanes in accordance with a transfer rate of image data.

According to the electronic apparatus of an aspect of the present invention, it is preferable that the touch panel is a capacitance touch panel or an electromagnetic induction touch panel.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is suitably applicable to a display device that has a data transfer circuit (interface).

REFERENCE SIGNS LIST

1: Control substrate
2: Flexible printed circuit substrate
3: Display panel
5: Timing controller (data transfer circuit, determining means, transferring means, deactivating means)
7a through 7c: Source driver
8: Gate driver
9: Display area
10: Display device
11 through 14, 21 through 24, 31 through 34: Data lane
15, 25, 35: Clock lane
16: Lane number control signal line
17: Frame memory
50: Transmitter circuit section
52: Transmitter-side lane number control circuit
53: Parallel-serial conversion section
54: Transmitter-side SW control circuit
55: Transmitter-side PLL circuit section
56: Data transmitter circuit
57: Clock transmitter circuit
58: Control signal outputting section
70: Receiver circuit section
72: Receiver-side lane number control circuit
73: Parallel-serial conversion section
74: Receiver-side SW control circuit
75: Receiver-side PLL circuit section
76: Data receiver circuit
77: Clock receiver circuit
80: Cable
81 through 84: Data lane
85: Clock lane
90: Host-side device
91: Control substrate
92: CPU
93: Graphic controller (data transfer circuit, determining means, transferring means, deactivating means)
94: Input device
95: Touch panel
96: Touch panel control circuit (sensing means)
98: Electronic apparatus
100: Display system (electronic apparatus)

The invention claimed is:

1. A data transfer circuit configured to transfer data with use of at least one of a plurality of data lanes, said data transfer circuit comprising:

a determining device configured to determine, based on information in relation to an amount of data to be transferred during a predetermined time period, the number of data lanes via which the data is transferred;
a transferring device configured to transfer the data with use of a determined number of data lane(s), which number has been determined by the determining device, out of the plurality of data lanes; and
a deactivating device configured to deactivate a data lane(s), which is not used to transfer the data, out of the plurality of data lanes; wherein
the data is indicative of an image to be displayed on a display panel;
one vertical period to display the image is divided into (i) a transfer period during which the data is transferred to a receiver circuit and (ii) a halt period during which the data is not transferred;
the information defines the transfer period and the halt period; and
the determining device sets the number of data lanes to zero during the halt period.

2. The data transfer circuit as set forth in claim 1, wherein:
the information is indicative of the number of tones of the image; and
in a case where the determining device determines, based on the information, that the number of tones of the image has been decreased, the determiner sets the number of data lanes to a smaller number.

3. The data transfer circuit as set forth in claim 1, wherein:
the information is indicative of the number of tones of the image; and
in a case where the determining device determines, based on the information, that the number of tones of the image has been increased, the determining device sets the number of data lanes to a larger number.

4. The data transfer circuit as set forth in claim 1, wherein:
the information is indicative of the number of colors of the image; and
in a case where the determining device determines, based on the information, that the number of colors of the image has been decreased from the number of colors for a color display to the number of colors for a monochrome display, the determining device sets the number of data lanes to a smaller number.

5. The data transfer circuit as set forth in claim 1, wherein:
the information is indicative of the number of colors of the image; and
in a case where the determining device determines, based on the information, that the number of colors of the image has been increased from the number of colors for a monochrome display to the number of colors for a color display, the determining device sets the number of data lanes to a larger number.

6. The data transfer circuit as set forth in claim 1, wherein:
the information is indicative of a refresh frequency of the display panel; and
in a case where the determining device determines, based on the information, that the refresh frequency has been decreased, the determining device sets the number of data lanes to a smaller number.

7. The data transfer circuit as set forth in claim 1, wherein:
the information is indicative of a refresh frequency of the display panel; and
in a case where the determining device determines, based on the information, that the refresh frequency has been increased, the determining device sets the number of data lanes to a larger number.

8. A data transfer circuit as set forth in claim 1, further comprising:
a clock lane,
the deactivating device more preferentially deactivating a data lane, which is located farther from the clock lane, out of the plurality of data lanes.

9. The data transfer circuit as set forth in claim 1, wherein:
said data transfer circuit is provided in a display device and defines a timing controller configured and programmed to transfer data, which is indicative of the image, to a source driver.

10. The data transfer circuit as set forth in claim 1, wherein:
said data transfer circuit is provided in a host-side device that is connected with a display device; and
said data transfer circuit defines a graphic controller configured and programmed to transfer data, which is indicative of the image, to a timing controller included in the display device.

11. A display device comprising a data transfer circuit recited in claim 9.

12. A display device comprising:
a data transfer circuit recited in claim 1, the data transfer circuit defines a timing controller configured and programmed to transfer data, which is indicative of the image, to a source driver; and
a performance lowering device configured to lower a performance of an output circuit that is provided in the source driver and supplies an analog voltage to the display panel during the halt period.

13. A host-side device comprising a data transfer circuit recited in claim 1.

14. An electronic apparatus comprising:
a display device; and
a host-side device,
the display device including a data transfer circuit recited in claim 1, the data transfer circuit defining a timing controller configured and programmed to transfer data, which is indicative of the image, to a source driver, and
the host-side device including a data transfer circuit recited in claim 1, the data transfer circuit defining a graphic controller configured and programmed to transfer data, which is indicative of the image, to the timing controller.

15. An electronic apparatus comprising:
a display device; and
an input device,
the display device including a data transfer circuit recited in claim 1, the data transfer circuit defining a timing controller configured and programmed to transfer data, which is indicative of the image, to a source driver, and
the input device including a touch panel and a sensor which (i) refrains from carrying out sensing of the touch panel during the transfer period and (ii) carries out sensing of the touch panel during the halt period.

16. A method for transferring data with use of at least one of a plurality of data lanes, said method comprising the steps of:
determining, based on information in relation to an amount of data to be transferred during a predetermined time period, the number of data lanes via which the data is transferred;
transferring the data with use of a determined number of data lane(s), which number has been determined in the determining step, out of the plurality of data lanes; and
deactivating a data lane(s), which is not used to transfer the data, out of the plurality of data lanes; wherein
the data is indicative of an image to be displayed on a display panel;

one vertical period to display the image is divided into (i) a transfer period during which the data is transferred to a receiver circuit and (ii) a halt period during which the data is not transferred;

the information defines the transfer period and the halt period; and the determining step sets the number of data lanes to zero during the halt period.

* * * * *